US008645233B2

(12) United States Patent
Srinivasan et al.

(10) Patent No.: US 8,645,233 B2
(45) Date of Patent: Feb. 4, 2014

(54) SOFTWARE INTERFACE MANAGEMENT SYSTEMS AND METHODS

(75) Inventors: Pradeepan Srinivasan, South Lyon, MI (US); Christopher A. Gillanders, Royal Oak, MI (US); Daniel G. Bolstrum, West Bloomfield, MI (US); Trenton W. Haines, Novi, MI (US)

(73) Assignee: GM Global Technology Operations LLC

( * ) Notice: Subject to any disclaimer, the term of this patent is extended or adjusted under 35 U.S.C. 154(b) by 644 days.

(21) Appl. No.: 12/696,357

(22) Filed: Jan. 29, 2010

(65) Prior Publication Data

US 2011/0112982 A1    May 12, 2011

Related U.S. Application Data

(60) Provisional application No. 61/259,398, filed on Nov. 9, 2009.

(51) Int. Cl.
*A01K 5/02* (2006.01)

(52) U.S. Cl.
USPC ............. 705/29; 705/348; 700/707; 700/107; 700/759; 719/315

(58) Field of Classification Search
USPC ............ 705/348; 700/107, 759; 707/E17.042
See application file for complete search history.

(56) References Cited

U.S. PATENT DOCUMENTS

| | | | |
|---|---|---|---|
| 6,035,297 A | 3/2000 | Van Huben et al. | |
| 6,041,268 A * | 3/2000 | Jin | 700/107 |
| 6,711,550 B1 | 3/2004 | Lewis et al. | |
| 6,975,914 B2 | 12/2005 | DeRemer et al. | |
| 7,124,150 B2 * | 10/2006 | Majjasie et al. | 1/1 |
| 7,171,380 B2 * | 1/2007 | Chiu et al. | 705/28 |
| 7,522,914 B1 | 4/2009 | Cook | |
| 7,778,720 B2 | 8/2010 | Alse | |
| 8,103,694 B1 * | 1/2012 | Topolovac et al. | 707/786 |
| 8,170,946 B2 * | 5/2012 | Blair et al. | 705/37 |
| 2006/0052896 A1 | 3/2006 | Woehler | |
| 2008/0249646 A1 | 10/2008 | Alse | |
| 2009/0006223 A1 * | 1/2009 | Liu et al. | 705/29 |

OTHER PUBLICATIONS

U.S. Appl. No. 12/696,180, filed Jan. 29, 2010, Srinivasan et al.

* cited by examiner

*Primary Examiner* — Vanel Frenel

(57) ABSTRACT

An interface control module includes a link generation module that generates a first link between a provider module and a consumer module. An interface contract module generates an interface contract. The interface contract corresponds to an interface of a product that includes the first link. The interface contract defines the interface based on a bill of materials (BOM). An interface assembly module assembles modules including the provider module and the consumer module to generate the product. An interface viewing module displays logical and physical views of the product on a display at least one of before and after assembly of the product.

20 Claims, 25 Drawing Sheets

Fig-11

CONFIGURE BOM - 11.11.24

BOM_MASTERLIST | BOM

CONTROLLER TYPE FLAVORS

GROUP DETAILS

| GROUP | PTCS_HCP | PTCS_EVT | PTCS_BOOT | PTCS_2NDBOOT | PTCS_EC |
|---|---|---|---|---|---|
| TORQUE | HCP | EVT | | | SO |
| ENGINE | HCP | MSG | | | SO |
| PLATFORM | HCP | MSG | | | SO |
| TRANSMISSION_RATIO_SELE. | HCP | EVT | | | MSG |
| TRANSMISSION_RATIO_CON. | HCP | EVT | | | MSG |
| TRANSMISSION_HYBRID_CO. | HCP | EVT | | | ECM |
| HYBRID | HCP | EVT | | | |

HYBRID RING DETAILS

| RING | HCP | EVT | ECM | C2C | HYBEC |
|---|---|---|---|---|---|
| ASSR | FUNC | | | | |
| ELCR | HCP | | MSG | | MSG |
| EOCR | HCP | | | | |
| EPCR | HCP | | | | |
| ESMR | HCP | | SHYBECM | | SHYBECM |
| ESSR | HCP | EVT | MSG | NF | MSG |
| HADR | HCP | | | | MSG |

ELCR-FUNCTIONAL COMPONENTS

| FUNCTIONAL COMPONENTS | HCP | | NF |
|---|---|---|---|
| ELCR_BASE | | | |

[ CLOSE ]

UNIVERSAL LIST CONFIGURATION (READ ONLY) — 260

CONFIGURE UNIVERSAL LIST OF GROUPS, RINGS, CONTROLLER TYPE FLAVORS, GROUP FLAVORS, AUTHORIZATION, NAMING VALIDATION AND E-MAIL NOTIFICATION CONFIGURATION CAN ALSO BE DONE HERE

264

| FIELD | VALUE |
|---|---|
| NAME | PHSR |
| TYPE | RING |
| DESCRIPTION | INTAKE AND EXHAUST CAM PHASER |
| OWNERS | PRI - QZ07KY (DAVID S.) |

ASSIGNING OWNERS (READ ONLY) — 266

PRIMARY OWNER

| OWNER NAME | OWNER ID |
|---|---|
| DAVID S. | QZ07KY |

SECONDARY OWNER

| OWNER NAME | OWNER ID |
|---|---|
| ASPEN ADMIN | ASPENADM |

[CANCEL] [CLOSE]

262 — PHSR

- PADR
- PASR
- PCOR
- PHSR
- PISR
- PLAR
- PLCR
- PLTR
- PMDR
- PMTR
- PQRR
- PRSR
- PSAR
- PTBR
- PTCS
- PTOR

[DONE]

SOFTWARE INTERFACE MANAGEMENT SYSTEMS AND METHODS

CROSS-REFERENCE TO RELATED APPLICATIONS

This application claims the benefit of U.S. Provisional Application No. 61/259,398, filed on Nov. 9, 2009. The disclosure of the above application is incorporated herein by reference in its entirety.

FIELD

The present application relates to product and content based management systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

There are various process stages involved in the developing and producing of a product. The process stages may include, for example, requirement, development, build, test, calibrate, validate and release stages. A company with a large and diverse portfolio may develop and produce a large number of products. Each product (e.g., a vehicle) may have various associated sub-products (e.g., engine controller, transmission controller, etc.). Each product and/or sub-product may have associated releases. Each release may have an associated series, model year, version and cadence. Cadence refers to a particular release date. Each product and/or sub-product may have an associated bill of materials (BOM). As a result, managing the development and production of a product across the product stages can be complex and chaotic.

SUMMARY

In one embodiment, an interface control module includes a link generation module that generates a first link between a provider module and a consumer module. An interface contract module generates an interface contract. The interface contract corresponds to an interface of a product that includes the first link. The interface contract defines the interface based on a bill of materials (BOM). An interface assembly module assembles modules including the provider module and the consumer module to generate the product. An interface viewing module displays logical and physical views of the product on a display at least one of before and after assembly of the product.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 11 is an exemplary bill of materials (BOM) window in accordance with an embodiment of the present disclosure;

FIG. 13 is an exemplary ring ownership configuration management window in accordance with an embodiment of the present disclosure;

DETAILED DESCRIPTION

Figure 1:
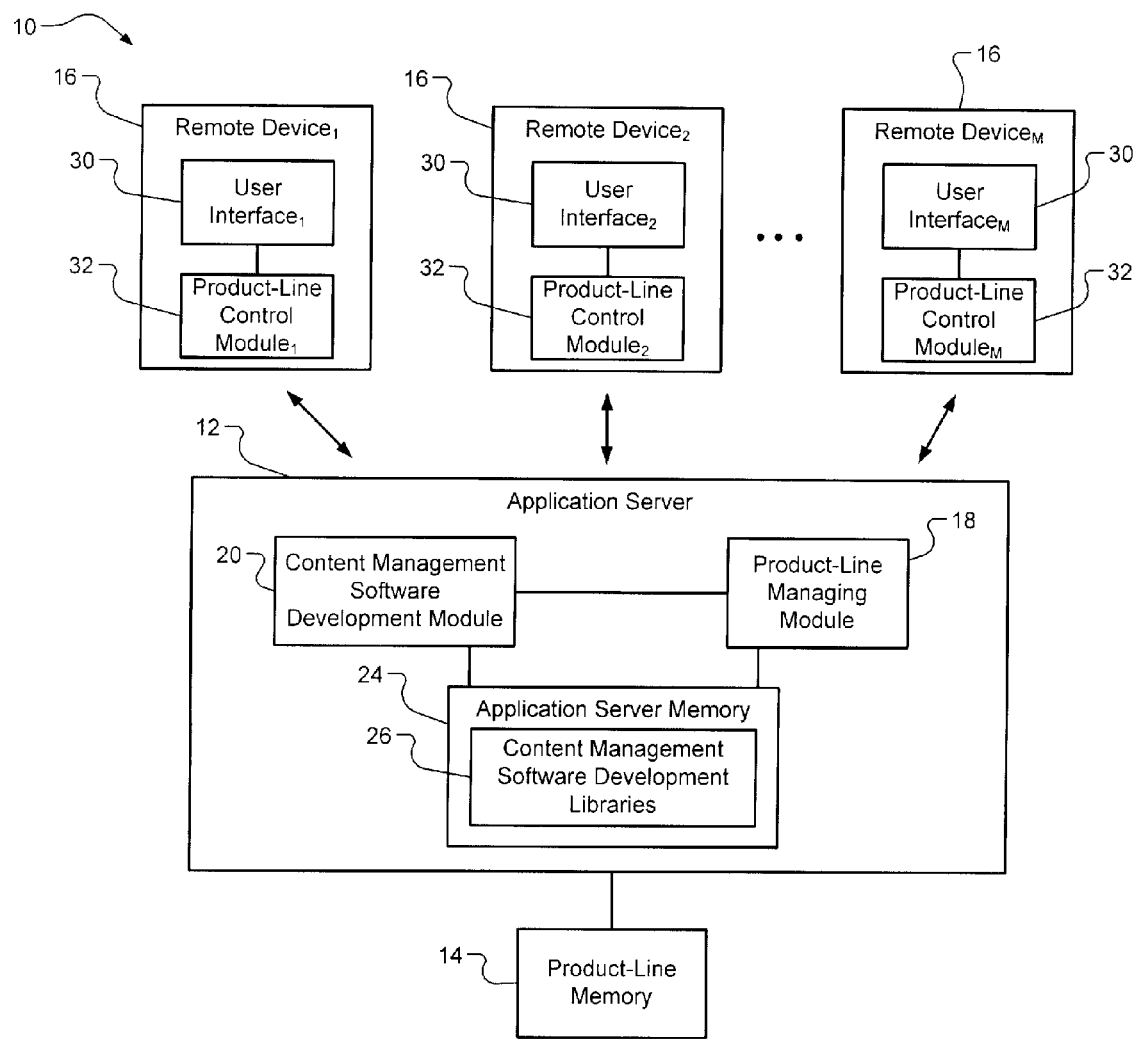
FIG. 1 is a functional block diagram of a portion of a product-line based content managing system in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), a controller, an electronic circuit, a processor (shared, dedicated, or group) and/or memory (shared, dedicated, or group) that execute one or more software or firmware programs, and/or a combinational logic circuit.

In addition, in the following description various variable labels and values are disclosed. The variable labels and values are provided as examples only. The variable labels are arbitrarily provided and may each be used to identify or refer to different items. For example, the variable label N may be used to refer to a number of modules or to a number of interface contracts. The values are also arbitrarily provided and may vary per application.

Managing common and product specific content of, for example, a control module of a vehicle is a challenge. A control module may be developed over a several year time frame and have various versions and incremental releases of associated work products. The below described systems and methods provide a framework that supports aspects of various types of content management for multiple product-lines of a complex portfolio.

Figure 2:
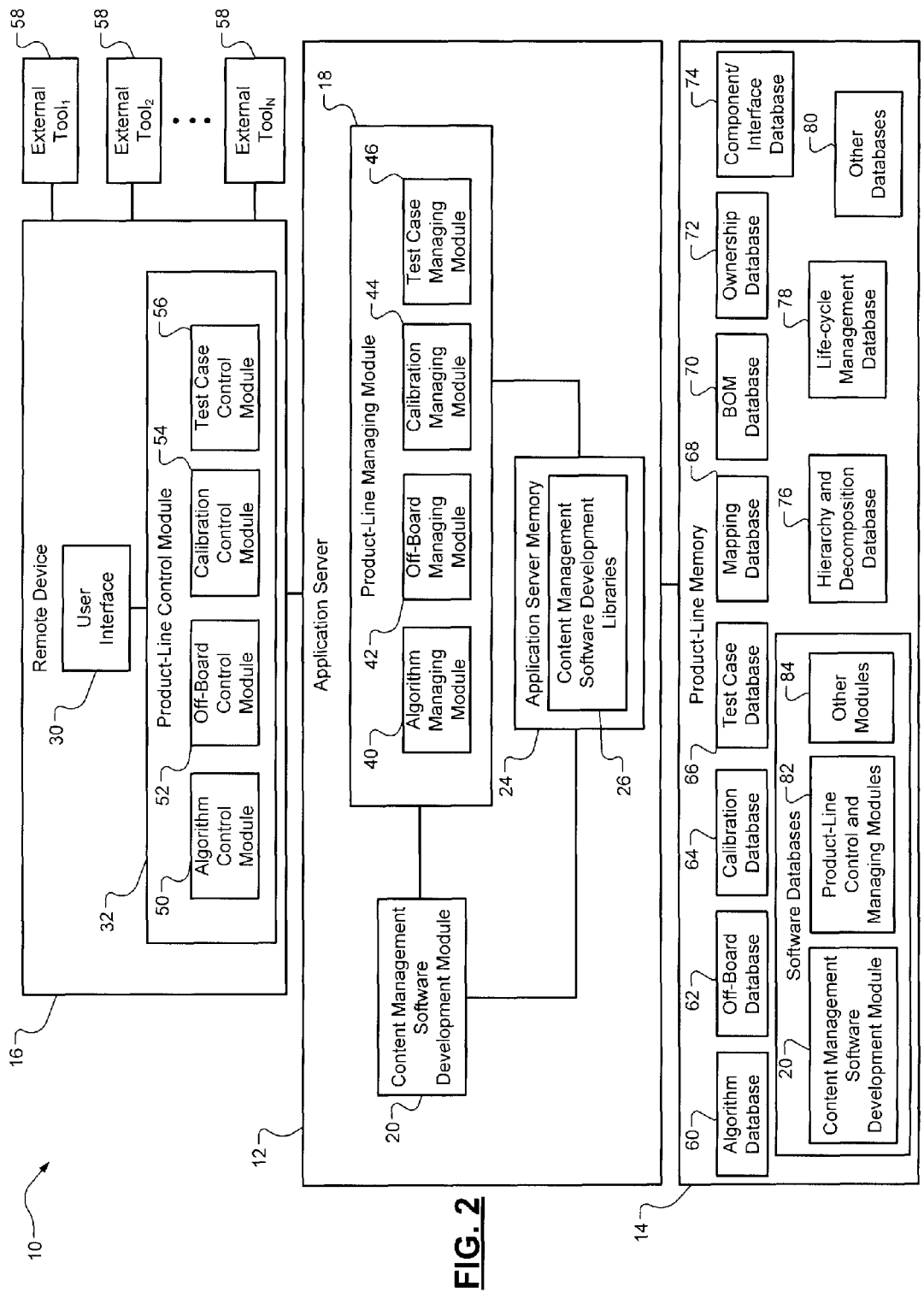
FIG. 2 is a functional block diagram of the product-line based content managing system of FIG. 1.

In FIG. 1, a portion of a product-line based content managing system (PBCMS) 10 is shown. The PBCMS 10 may be referred to as a globally accessible product-line based content management application (ASPEN) system. The PBCMS 10 provides a product-line management framework in a controls development environment to manage development data. The PBCMS 10 also provides a data life cycle management system, which can be used to develop, manage, link, integrate and exchange product content information. The product content information may include information entered and/or developed for features, objects, components, and interfaces, as well as information for product-line based controls development, build, test, calibration and verification purposes. The PBCMS 10 provides algorithm and software to develop, integrate, calibrate, and verify a product. FIG. 2 further illustrates the architecture of the PBCMS 10.

The PBCMS 10 includes an application server 12, product-line memory 14 and any number of remote devices 16. The application server 12 is located at a central location and includes a product-line managing module 18 for managing products of a product-line portfolio and associated content. The application server 12 may be accessed by any one of the remote devices 16.

The term "product-line" may refer to method(s) that are used to manage common and variant features across various products in a complex product portfolio. A product-line may refer to a particular product and corresponding modules and content thereof. A product portfolio may include hundreds of products. The products may be similar, such as various control modules, but yet may each be unique. Common features are features that are shared and/or are the same in two or more products. Variant features are features that are, for example, used in a first product and are not used in a second product. A variant feature may be a feature that is dedicated solely to a single product or a single group of products.

Figure 5:
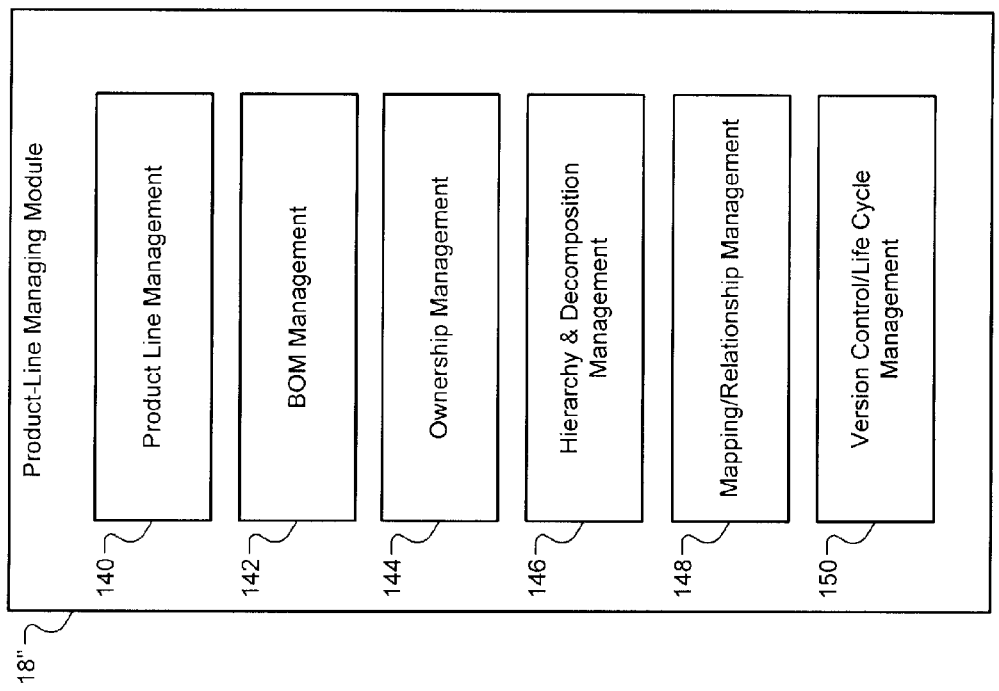
FIG. 5 is a functional block diagram of a product-line managing module with management layers in accordance with an embodiment of the present disclosure.

The application server 12 includes the product-line managing module 18, a content management software development (CMSD) module 20, and application server memory 24. The CMSD module 20 includes development software that may be used to generate custom software. The product-line managing module 18 provides software development support including versioning, propagation, etc. The product-line managing module 18 provides various layers of management of a product-line with "fine grain" object decomposition for effective data sharing. The management layers are shown in FIG. 5.

The product-line managing module 18 stores and manages data relationships to provide analysis capabilities including traceability for various products across a product portfolio. The product-line managing module 18 provides methods and tools with proactive error checking for efficient and reliable authoring of data associated with objects, common and variant features including common and variant components and interfaces. The data may include BOM software, component software, interface software, data dictionary entries, algorithm description documents, source code, autocode, etc. Data dictionary entries may refer to manually entered data regarding a particular parameter (e.g., engine speed) used by a component, interface, or associated consumer. Consumers are described below. Autocode may refer to code generated by a (model-based) code generator.

Thousands of components and interfaces may be combined to build a particular control module. A component may be, for example, a module and/or a particular set of code for performing a certain task or a group of tasks (e.g., an electronic throttle control module, a cruise control module, a cylinder deactivation module, an engine speed determining module, etc.). An interface may refer to an interface between modules of a control module that provide a certain parameter. As an example an interface may be between an engine speed determining module and a cruise control module. The engine speed determining module and the cruise control module may be part of an engine control module. The engine speed determining module may provide a current engine speed to the cruise control module. An interface may be used by a first module to access memory and to obtain a parameter stored in the memory by a second module. An interface that is between control modules may be associated with a message, which may be transmitted or sent between control modules, such as between an engine control module and a transmission control module.

Each component and interface may have an associated object that identifies and defines that component or interface including identifying the attributes of the object. The attributes may include, for example, a purpose of the component, a module name, a class, a unit of measure, a type, minimum and maximum ranges, minimum and maximum resolutions, initial values, flavor(s) (i.e., variant(s)), calibration partitions, etc. The attributes of an object may be defined by a data dictionary entry (DDE). The application server memory 24 stores content management software development libraries 26, which may be used by the CMSD module 20 and the product-line managing module 18.

The application server 12 and the product-line memory 14 provide a central repository to access product-line information. The application server 12 and the product-line memory 14 provide access to a single source of information for reusing, deriving, modifying and/or elaborating work products (e.g., autocode for a particular control module). The product-line memory 14 is used to store product-line data associated with product-line management. The product-line memory 14 may store software and data associated with the CMSD module 20 and/or the product-line managing module 18.

The remote devices 16 include user interfaces 30 and product-line control modules 32. Each of the user interfaces 30 may include a keyboard, a display, a mouse, and/or other user interface device for communicating with the product-line control modules 32. The product-line control modules 32 communicate over wired and/or wireless links with the application server 12. The remote devices 16 allow various engineers, such as design engineers, development engineers, build engineers, BOM engineers, etc. to remotely access and use the application server 12 and obtain data and/or software stored in the product-line memory 14.

As used herein, a BOM in a simplest form may refer to a list of features, such as a list of components and interfaces (each of which having a certain function or set of functions), that are used to makeup a product. The product-line control modules 32 allow the engineers to access the application server 12 and design and/or build a product, such as a control module. A BOM may also include rule sets that identify: the features that are included in a version of a ring; the versions that are included in a ring flavor; the ring flavors that are included a group flavor, the group flavors that are included in a control system; the control systems that are included in a product, etc. The rule sets may include other BOM related information, such as feature, component, and interface information.

Figure 7:
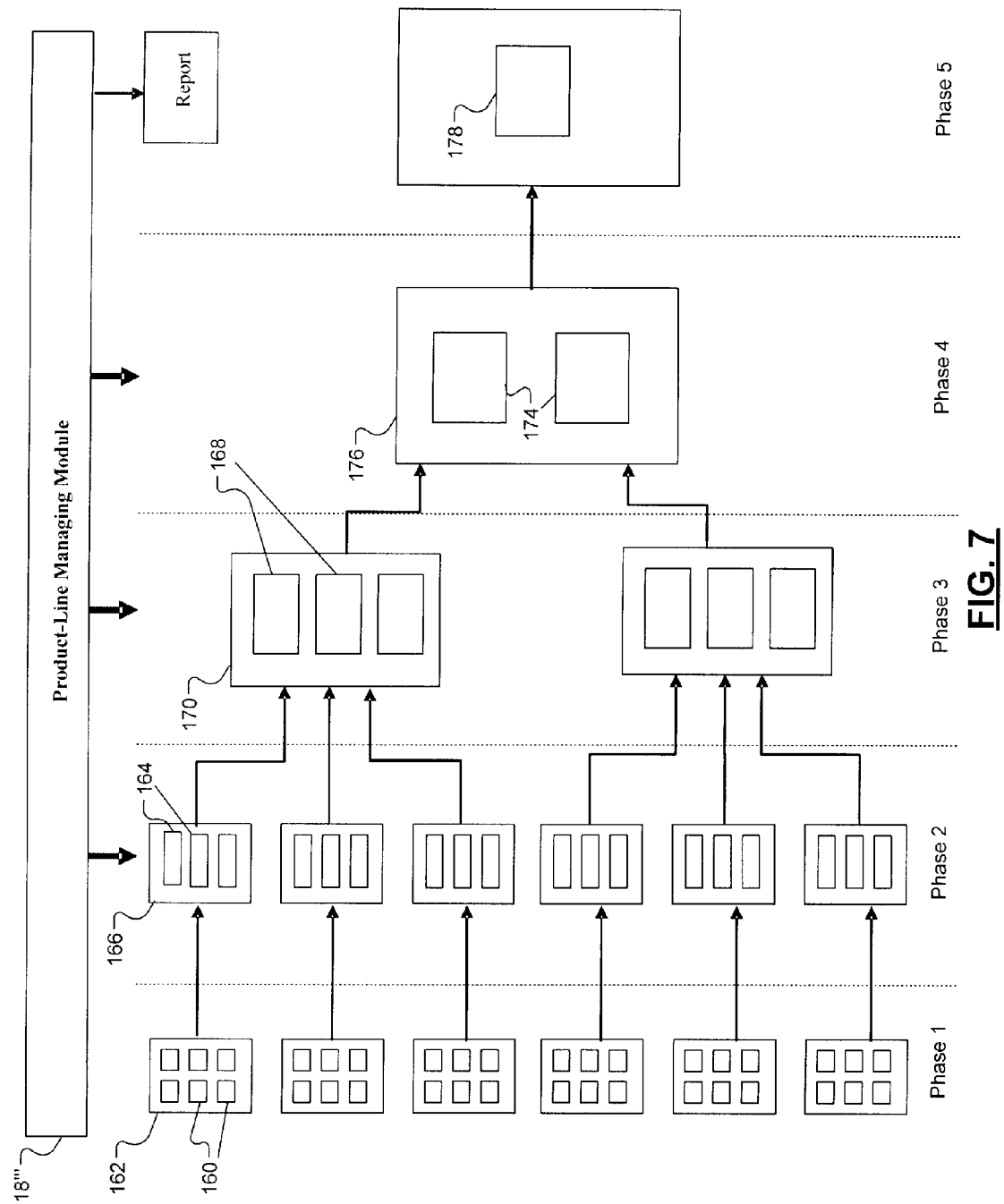
FIG. 7 is an exemplary product development and build process in accordance with an embodiment of the present disclosure.

A product may refer to a control module (e.g., engine control module, transmission control module, hybrid control module, etc.). An example step-by-step make up of a control module is shown in FIG. 7. Each control module of a product portfolio has a set of selected group flavors, each group flavor has a set of selected ring flavors, and each ring flavor may have a set of ring flavor sub-versions, and each ring flavor sub-version has a set of features (e.g., components and/or interfaces). Components, interfaces, group flavors and ring flavors are further described below.

The product-line control and/or managing modules 18, 32 may allow, for example, a design engineer to design and/or select software components (e.g., a cruise control software object and code, a cylinder deactivation software object and code, etc.) and/or interfaces for a control module to be built based on a BOM. The BOM may be stored in the product-line memory 14. Example interfaces are interfaces associated with providing parameters, such as engine speed, temperature, oil pressure, etc. Interfaces may be between hardware and software elements or between software modules. Interfaces may refer to objects that identify signals or outputs generated and received by hardware devices and/or software modules. Based on the selected features, components and/or interfaces, a build engineer may then access the PBCMS 10 to initiate generation of control module build based on selected common and variant features. The common and variant features may include the software components and/or interfaces selected by the design engineer. This and other examples are further described below.

The PBCMS 10 allows for entering of feature, component and interface requirements and data entry early in development of a product with automatic updating of BOMs for downstream updating in a manufacturing process. Data entered early in a manufacturing process may be reused several times in downstream steps of the manufacturing process. Reuse is provided across different products and for downstream steps in a manufacturing process of a single product. The PBCMS 10 provides "fine grain" management of features, components and interfaces associated with each product or control module produced. The PBCMS 10 generates BOMs that allow for automatic sharing and updating of components and interfaces across ring flavors, group flavors, control systems, product divisions, vehicles, etc. Fine grain management early on in a manufacturing process prevents manual entry of data later in the manufacturing process. As an example, when an engine speed determining module is updated, BOMs of control modules that include that engine speed determining module and/or that use an engine speed signal from that engine speed determining module are automatically updated.

The PBCMS 10 allows for newly created versions to replace existing versions to automatically generate new and/or updated ring flavors, group flavors, control systems, and/or control modules. This saves time and prevents chaotic behavior and/or prevents inconsistencies in a BOM. Inconsistencies in a BOM, such as inconsistencies in available and required versions of a ring flavor, can delay or prevent building of a product and/or cause errors in a built product.

Referring now also to FIG. 2, an example architecture of the PBCMS 10 is shown. The PBCMS 10 includes the application server 12, the product-line memory 14 and one or more remote devices 16 (one of the remote devices 16 is shown in FIG. 1). The application server 12 includes the product-line managing module 18, the CMSD module 20, and the application server memory 24. The product-line managing module 18 may include an algorithm managing module 40, an off-board managing module 42, a calibration module 44, and a test case managing module 46. The remote device 16 includes a product-line control module 32 that may include an algorithm managing module 50, an off-board managing module 52, a calibration module 54, and a test case managing module 56, which may correspond to respective ones of the managing modules 40-46.

The control modules 50-56 may access one or more external tools 58. The external tools may be stored on the remote device 16, in the application server memory 24, in the product-line memory 14 and/or may be stored elsewhere and accessible by the remote device 16.

The algorithm control and managing modules 40 and 50 may be used to generate software algorithms. The algorithm control module 50 may access an external tool, such as a computing language software tool (e.g., Matlab). The off-board control and managing modules 42 and 52 may be used to generate, for example, diagnostic software. The calibration control and managing modules 44 and 54 are used to generate calibration software and/or to calibrate built components, versions, ring flavors, group flavors, control systems and/or products. The calibration control and managing modules 44 and 54 may access an external tool, such as a calibration instrumentation tool.

The test case control and managing modules 46 and 56 are used to generate test software and/or to test a built item, such as one or more components, interfaces, versions, ring flavors, group flavors, control systems and/or products. The test case control and managing modules 46 and 56 may access an external tool, such as a test stand for testing the built item.

The product-line control module 18 supports the user interface 30 and provides presentation and publishing capabilities. The product-line managing module 18 provides lifecycle data assembly, data analysis, data translation, data reuse, data linking, and data sharing capabilities.

The application server 12 and the product-line memory 14 may be globally accessed from various geographical locations via the remote devices 16. One or more of the remote devices 16 may be co-located with the application server 12 at a site. The product-line memory 14 may be a central repository of product-line based content information. The product-line memory 14 includes various databases. The databases may include an algorithm database 60, an off-board database 62, a calibration database 64, and a test case database 66, which may correspond to the control and managing modules 40-46 and 50-56. The databases may also include databases that are associated with the management layers of the PBCMS 10, such as a mapping database 68, a BOM database 70, an ownership database 72, a component and interface database 74, a hierarchy and decomposition database 76, a life-cycle management database 78, and other databases 80. The databases 68-80 may be combined into a single database, may share information, or may be distinct databases as shown. The databases may also include, for example, software generation, control and managing databases 82 that store, for example, the CMSD module 20, the product-line control and managing modules 40-46 and 50-56 (designated 82), and other modules 84.

Figure 3:
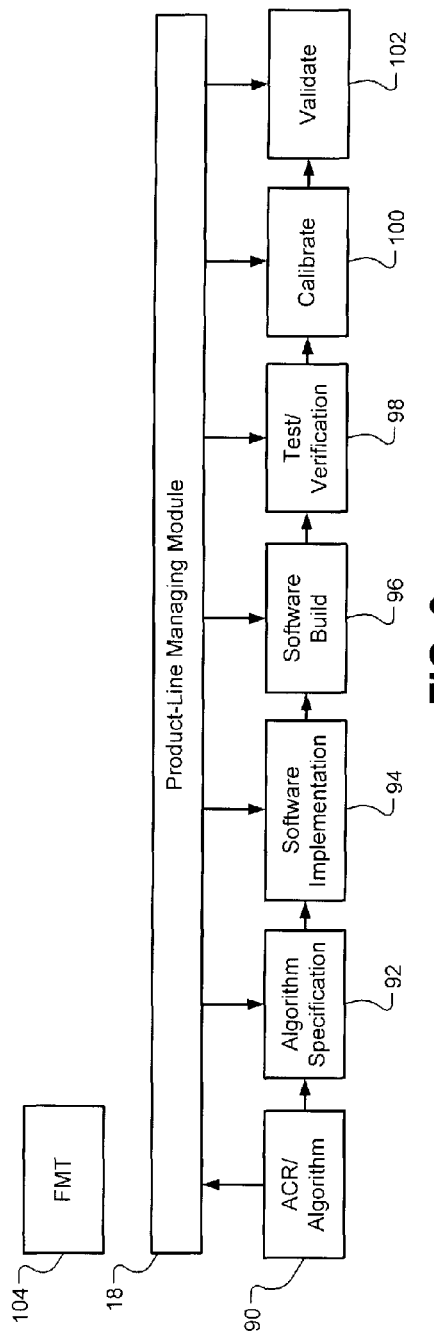
FIG. 3 is a product-line process diagram in accordance with an embodiment of the present disclosure.

In FIG. 3, a product-line process diagram is shown. The development and production of a product may include various stages, such as an algorithm change request (ACR) or algorithm initiation stage 90, an algorithm specification stage 92, a software implementation stage 94, a software build stage 96, a test and verification stage 98, a calibration stage 100 and a validation stage 102. The stages 92-102 may be performed and managed based on information including rule sets from the product-line managing module 18. The product-line managing module 18 may generate the information and rule sets based on a received BOM(s) and series release timing generated by a factory management module (FMM) 104.

The ACR or algorithm initiation stage 90 may be referred to as a requirement stage and may include the entering of project requirements, calibration data, variables, interface information, and/or data dictionary entries. The algorithm specification stage 92 includes the designing of components and/or interfaces based on the information entered in the requirement stage and/or based on algorithm description documents (ADDs) and design failure mode effects analysis (DFMEA) reports. The DFMEA reports may be generated by the product-line managing module 18.

The software implementation stage 94 includes code development and construction for a component or sub-product; each of which having a respect code set. The software implementations stage 94 may be performed based on software information generated by the product-line managing module 18. The software information may include interface project autocode, interface layer autocode, data objects autocode, conformed calibration partitioning information, initial values, and ranges for test cases. Autocode may refer to code that is automatically generated by the product-line managing module 18 based on a BOM and selected ring flavors.

The software build stage 96 includes the assembling of code sets generated during of the software implementation stage 94 to build a product. The software sets are combined and compiled in this stage. The combining may be performed based on build information generated by the product-line managing module 18. The build information may include calibration partitioning files, calibration range limits, description information, software assembly information and build automation information.

The controller test and verification stage 98 includes test and verification of the product generated in the software build stage 96. The test and verification stage 98 may be performed based on verification information generated by the product-line managing module 18, such as ranges for test cases, initial values, calibration and variable changes from the last (previous) release.

The calibration stage 100 includes calibration of the product tested and verified during the test and verification stage 98. The calibration stage 100 may be based on calibration information generated by the product-line managing module 18, such as build products, a responsibility matrix, lab files, calibration changes from a last (previous) release and updates for a calibration users guide. The validation stage 102 includes validation of the product calibrated during the calibration stage 100. After the validation stage, the product may be released. This may be referred to as the release stage.

Figure 4:
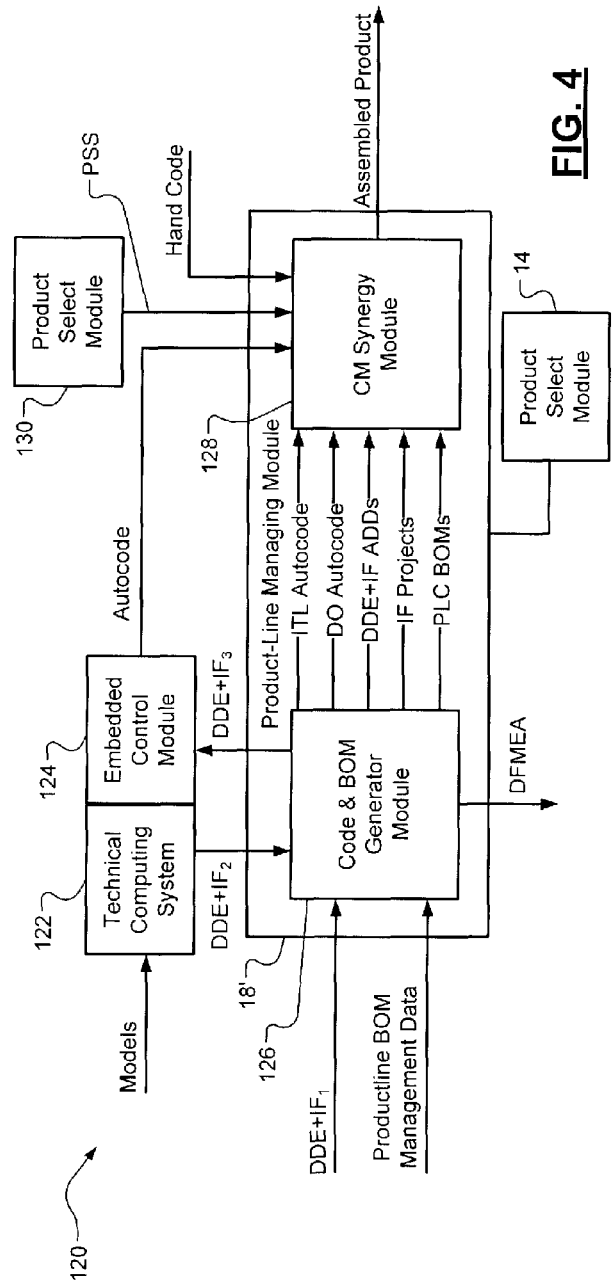
FIG. 4 is a functional block diagram of a production system incorporating a product-line managing module in accordance with an embodiment of the present disclosure.

In FIG. 4, a production system 120 is shown. The production system 120 includes a product-line managing module 18', a technical computing system 122, and an embedded coding module 124. The product-line managing module 18' includes a code and BOM generator module 126 and a configuration management (CM) synergy module 128. The product-line managing module 18' has access to the product-line memory 14. Data received and generated by the code and BOM generator module 126 and a CM synergy module 128 may be stored in the product-line memory 14.

The code and BOM generator module 126 receives project requirements associated with a product(s), such as project requirements for components and interfaces of a particular control module. The project requirements may include DDEs and interface information (IF) originally generated by engineers (e.g., development engineers). The project requirements may be provided directly to the product-line managing module 18', as shown by signal DDE+IF$_1$, or may be provided by a technical computing system. As an example, the technical computing system 122 may operate based on Matlab, receive requirement models and provide DDE and IF to the product-line managing module 18'. This is shown by signal DDE+IF$_2$. The code and BOM generator module 126 may provide place holders for development data and other work items.

The code and BOM generator module 126 and generates various types of code and project information based on the project requirements. The code and project information includes DDE and IF source code, interface layer autocode, data objects autocode, DDE and IF algorithm description documents, interface projects, product-line and control module BOMB, DFMEA template reports, as shown by respective signals DDE+IF$_3$, ITAutocode, DOAutocode, DDE+IF-ADDs, IFProjects, PLCBOMs and DFMEA. These signals may be generated based on the received signals DDE+IF$_1$ and DDE+IF$_2$ and/or product-line BOM management data received by the code and BOM generator module 126. The product-line BOM management data may refer to data or requests received from a BOM administrator that manages system level architectures of product projects.

The embedded coding module 124 generates project autocode ProjectAutocode based on the signal DDE+IF$_3$. The CM synergy module 128 assembles a product based on a product select signal from a product select module 130. The product select module 130 may be operated by, for example, a build engineer. After selection of a product, the CM synergy module 128 assembles the product based on the DDE+IF$_3$, ITAutocode, DOAutocode, DDE+IFADDs, IFProjects, and/or BOM signals. The product may also be assembled based on hand code received by the CM synergy module 128.

In operation, the code and BOM generator module 126 captures the data objects, control requirements, and characteristics of the components and interfaces of a product(s) (e.g., a control module(s)). This includes the capturing of ring flavor information, version information, group flavor information, sub-system or control system information, etc. for each product to generate the PLCBOMs. For example only, the code and BOM generator module 126 may be associated with first and second phases of a development and build process, as shown in FIG. 7. The CM synergy module 128 may be associated with third, fourth and fifth phases of the development and build process.

In FIG. 5, a product-line managing module 18", such as one of the product-line managing modules 18 and 18' of FIGS. 1-4, with management layers is shown. The management layers provide support for fine grain objects through development data management capabilities of each layer. Each of the management layers may be a single distinct management module, a set of dedicated management modules, or be provided in a shared management module. The management module(s) of a first management layer may be shared by a second management layer. The management layers may be provided by a single management module. The management layers include a product-line management layer 140, a BOM management layer 142, an ownership management layer 144, a hierarchy and decomposition layer 146, a mapping and relationship management layer 148, and a version control and life cycle management layer 150.

Figure 6:
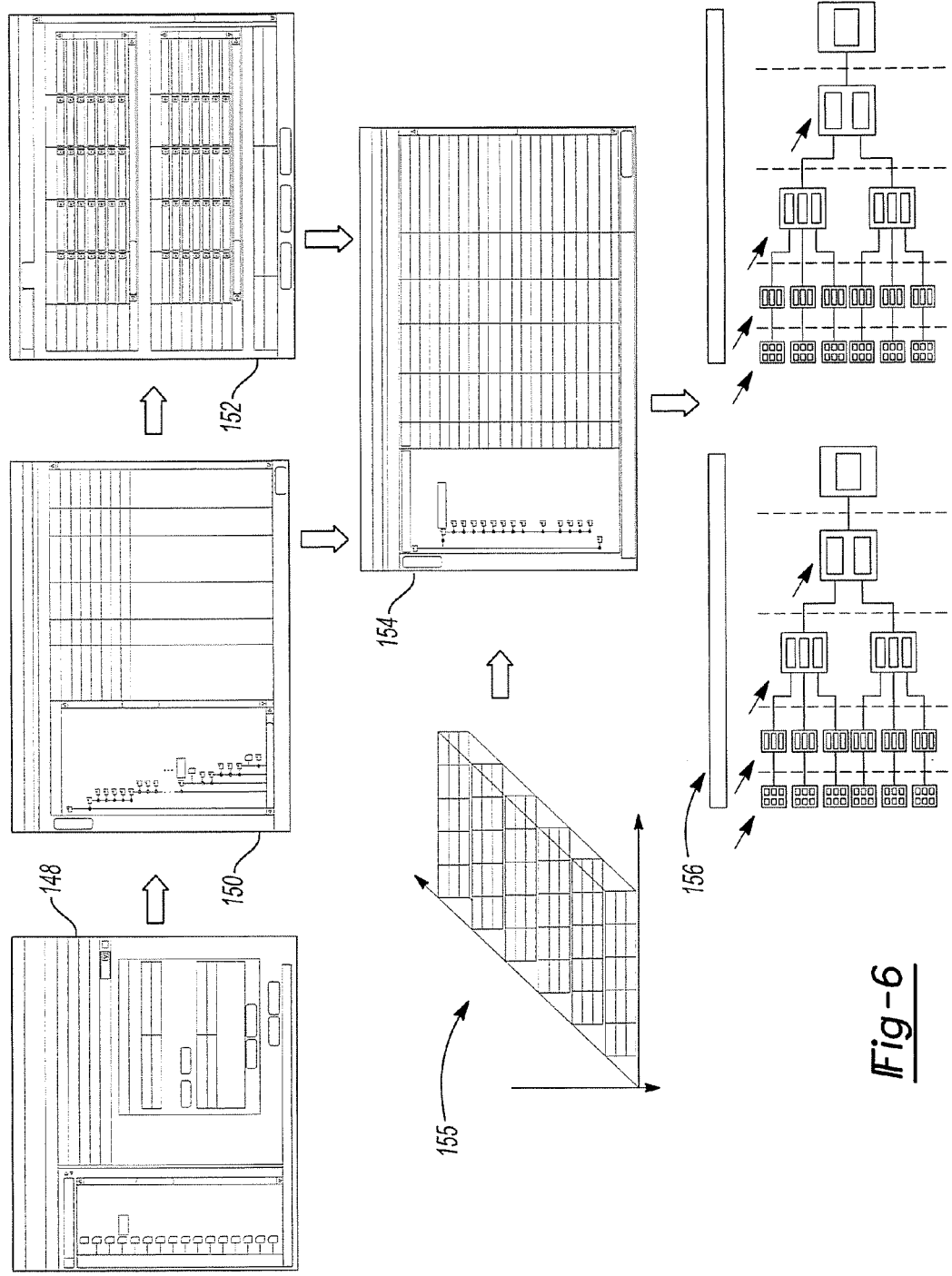
FIG. 6 is an exemplary product-line based content management framework in accordance with an embodiment of the present disclosure.

The product-line management layer 140 provides a product-line framework by which a development and build process of a product may be implemented for associated BOM release dates. The product-line management framework may include product-line hierarchal management and stream specific (series release) and control module specific BOM management. An example of a product-line framework is shown in FIG. 6. An example of a development and build process is shown in FIG. 7, which may be administered by the product-line management layer 140. The function of the product-line management layer 140 is further described with respect to the framework of FIG. 6.

The BOM management layer 142 allows for the generation and management of product-line BOMs including product BOMs and control module BOMs. The BOM management layer 142 generates BOM rule sets that may be used in a development and build process, such as that shown in FIG. 7. The rule sets may be used when, selecting features and content for versions and when assembling each content level item of a product. A content level item may include ring flavors, group flavors, control systems. Content level items are assembled according to the product-line BOM and/or associated product-line BOM rule sets.

The ownership management layer 144 is used to record ownership of each content level item, such as ownership of each component, interface, ring flavor, group flavor, control system, etc. A set of data and/or code may be owned or assigned to one or more individuals. Each owner may have an assigned role, which may be recorded by the ownership management layer 144. An example of an ownership configuration management layer window is shown in FIG. 13.

Figure 9:
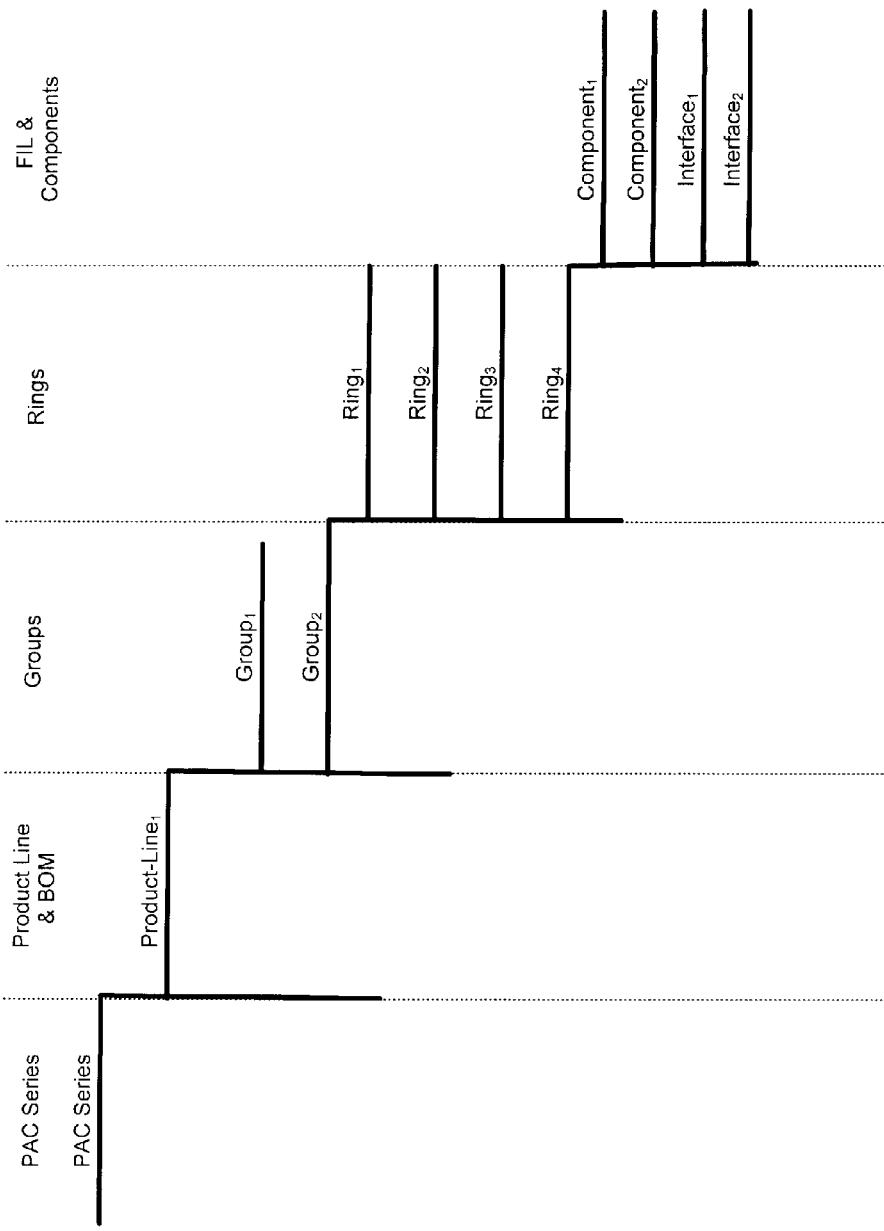
FIG. 9 is an exemplary project decomposition diagram in accordance with an embodiment of the present disclosure.
Figure 10:
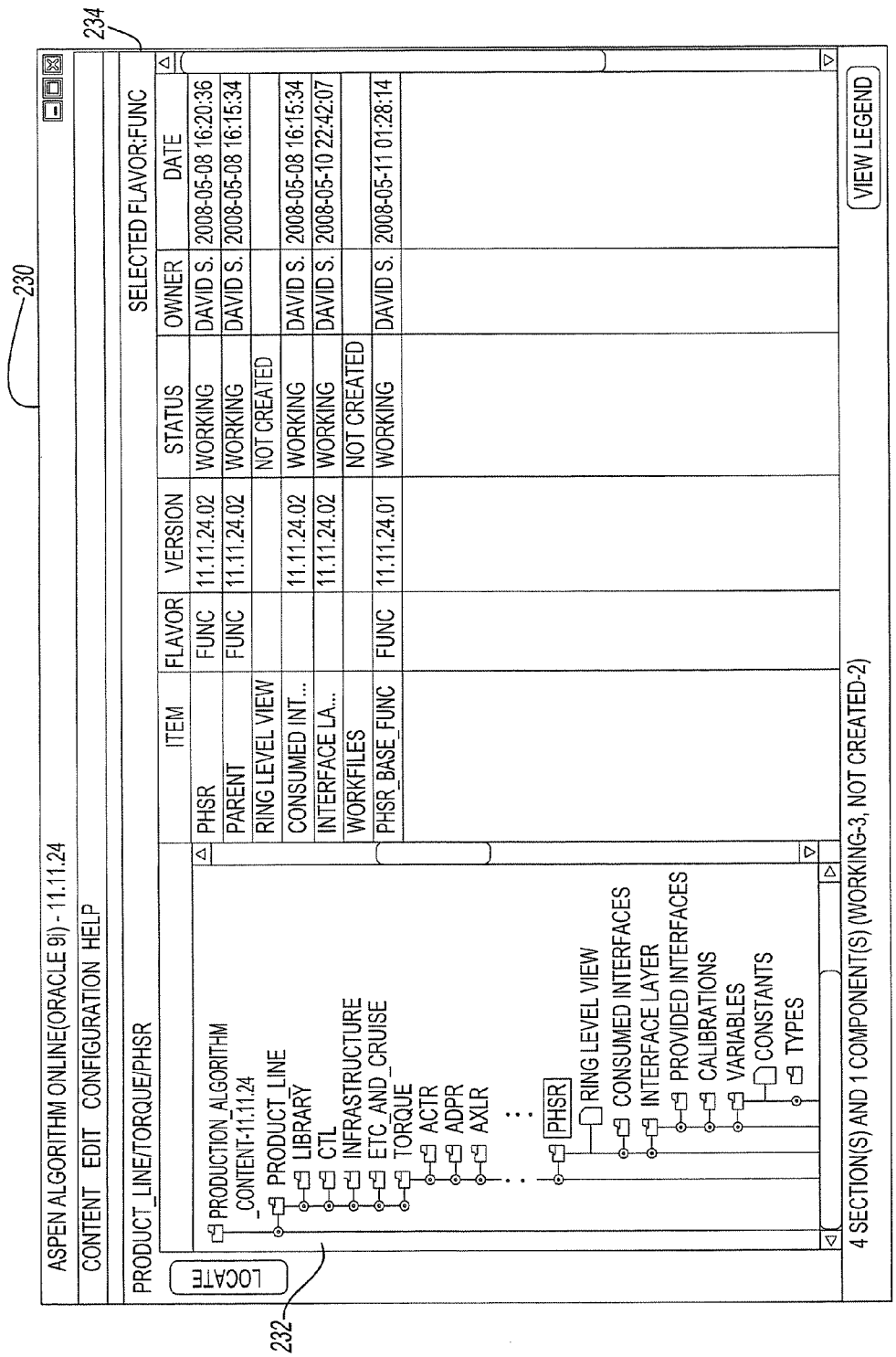
FIG. 10 is an exemplary ring project window in accordance with an embodiment of the present disclosure.
Figure 14:
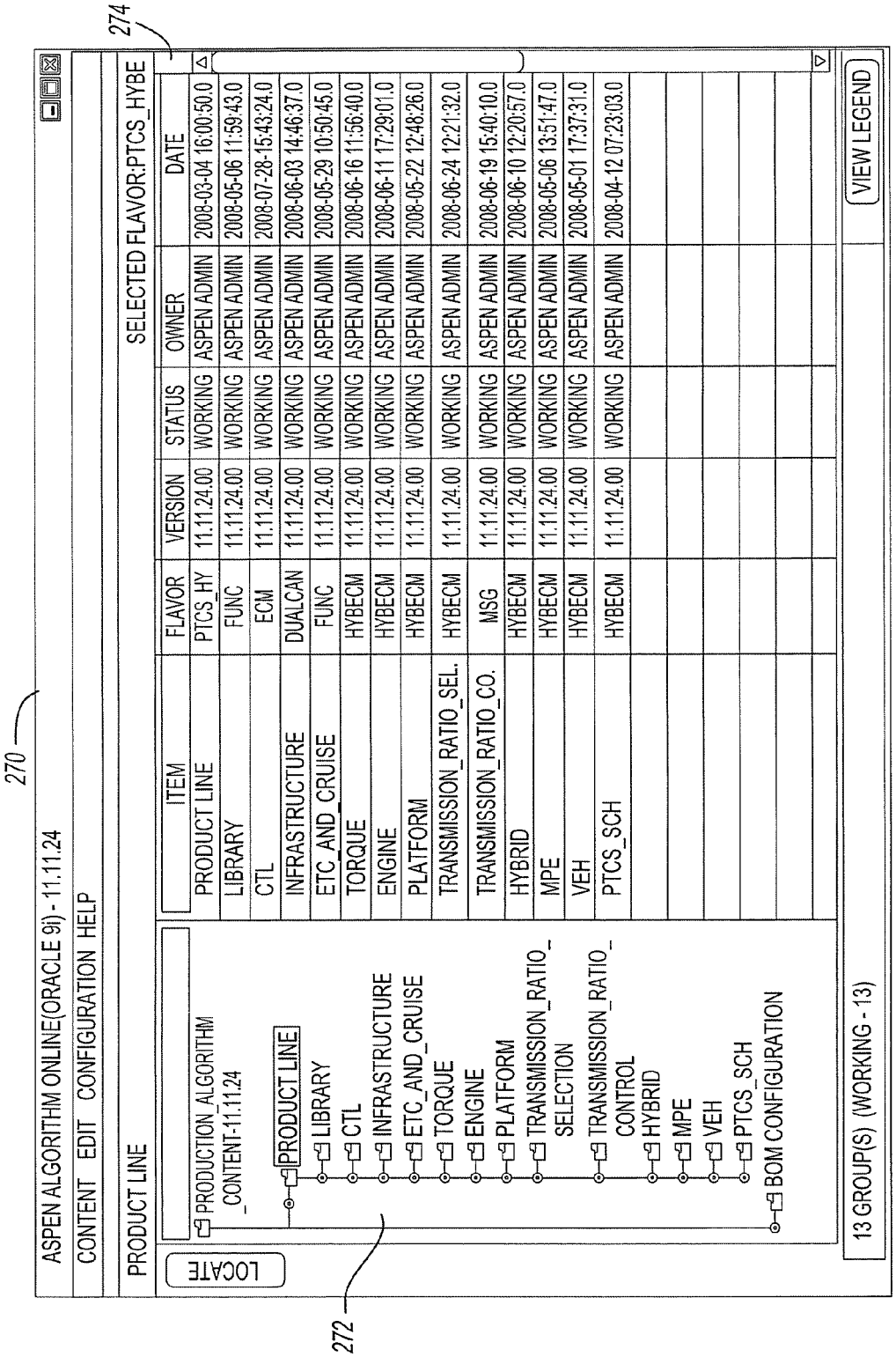
FIG. 14 is an exemplary product-line content window in accordance with an embodiment of the present disclosure.

The hierarchy and decomposition layer 146 may be used to generate and manage a hierarchy or tree of production algorithm content (PAC) for a series, model year, release and cadence. The series, model year, release and cadence of a product is designated by a series of values, for example, 11.10.2.1 refers to the eleventh series, model year 2010, release 2 and first cadence release. When the cadence is 1, the cadence value may not be used when identifying a particular PAC, project and/or product. Example hierarchies and associated decomposition are shown in FIGS. 9, 10 and 14.

Figure 12:
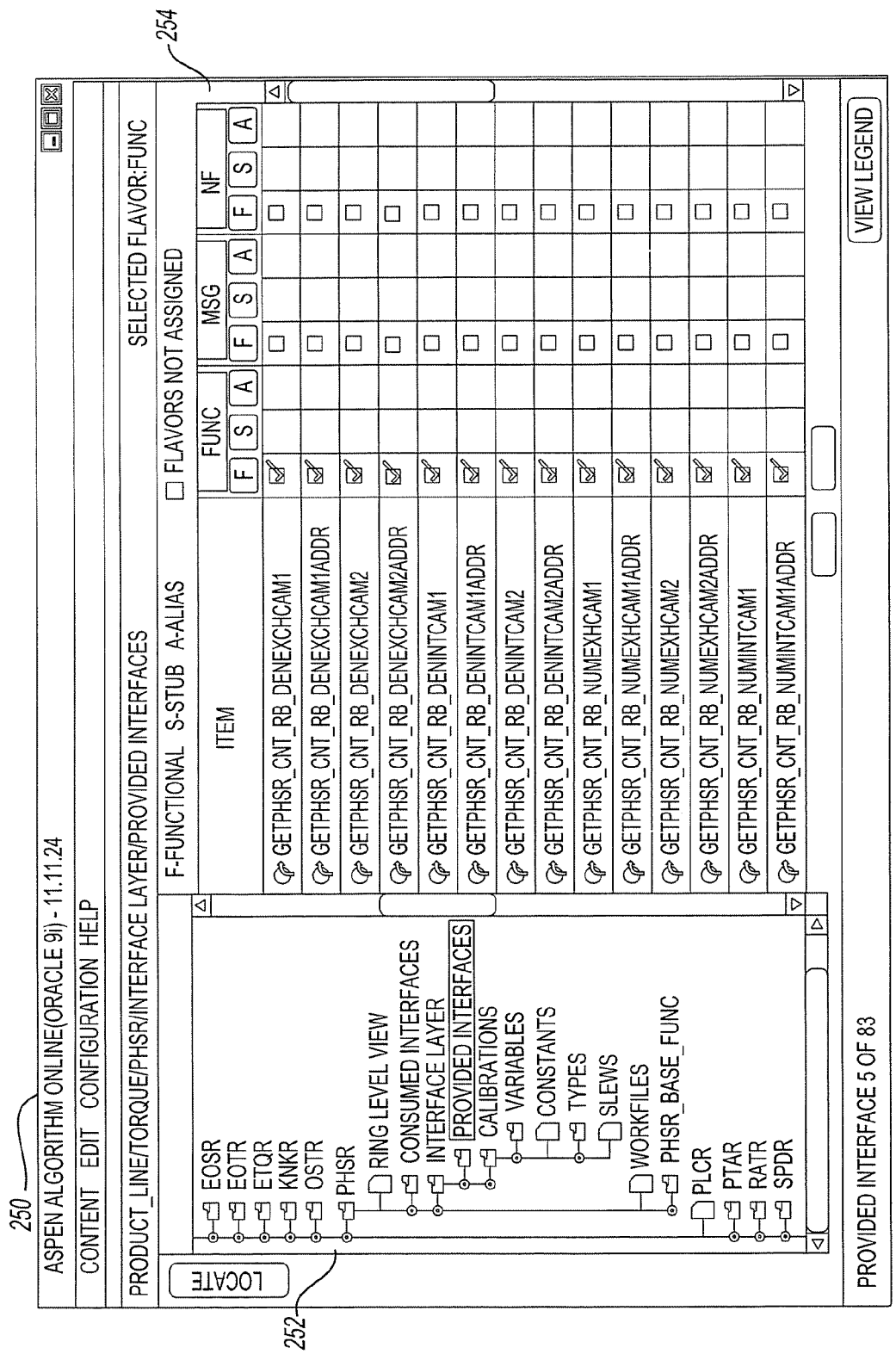
FIG. 12 is an exemplary flavor assignment window in accordance with an embodiment of the present disclosure.

The mapping and relationship management layer 148 is used to establish relationships between BOMs and content level items, such as between BOMs, components, interfaces, versions and/or ring flavors. The mapping and relationship management layer 148 may be referred to as a software architecture management layer. The interfaces may have associated messages that are transmitted, for example, between control modules. An example ring flavor assignment window is shown in FIG. 12.

Figure 16:
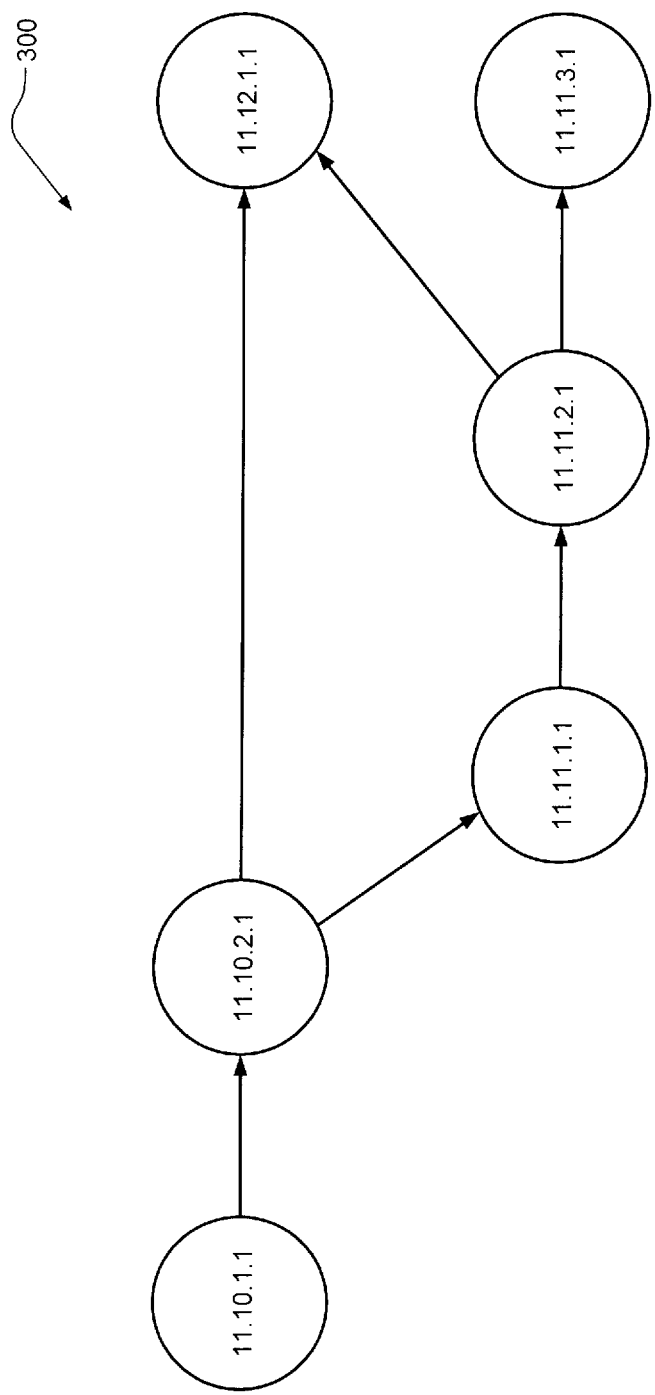
FIG. 16 is a life cycle diagram in accordance with an embodiment of the present disclosure.

The version control and life cycle management layer 150 is used to manage versions and record release and expiration dates for each version. A new version or baseline version may be created when a previous version is modified. The product-managing module may freeze (prevent from being altered) a particular version after a predetermined period and/or when a new version is created. The version control and life cycle management layer 150 may identify the status and stage of a particular version including whether the version is in development, build, calibration and/or verification. A version and life cycle management diagram is shown in FIG. 16.

The product-line managing module 18" may support for "right" authoring mechanisms, such as office tools, graphical user interface (GUIs), third party applications, etc. The product-line managing module 18" may include a right authoring layer and/or module that provides this support.

In FIG. 6, a framework diagram is shown illustrating a product-line based content management framework provided by the PBCMS 10 of FIGS. 1 and 2 is shown. The product-line based content management framework is used to generate product-line BOMs that may be used in a development and production process. The product-line based content management framework allows for the entering and management of common and variant features, identifying and recording of ownership of the common and variant features, defined roles of common and variant features, ring flavors, group flavors, control systems, etc. This may be shown by one or more universal configuration windows (an example configuration widow 148 is shown).

Project BOMs 150 and control module BOMs 152 are generated based on the information entered. A product-line BOM 154 for a particular release is generated based on the associated project BOM and/or associated control module BOM and a product-line release matrix 155. The product-line BOM 154 may then be used to generate BOM rule sets (e.g., the rule sets described with respect to the embodiment of FIG. 7) and to build a product in a development and build process (es), as shown by product development and build process diagrams 156.

In FIG. 7, an exemplary product development and build process is shown. In one embodiment, the product development and build process is software-based and is used to develop and build a control module. The product development and build process may include five phases. The first and second phases may be managed by a product-line managing module 18''', such as one of the product-line managing modules 18, 18', 18" based on a product-line BOM. The third, fourth and fifth phases may be performed by the product-line management module 18''' to automatically build, for example, a control module based on the product-line BOM.

During the first phase, the development engineer assigned to a particular feature, such as a particular component and/or interface, may access a PBCMS at a remote device to define and/or generate the feature and associated messages. The feature and associated messages may be defined using for example the technical computing system 122 of FIG. 4. The feature and associated messages may be generated based on a first BOM rule set that identifies which version(s) that are associated with that feature. The application server may provide the first BOM rule set to the remote device. This allows for the entry, development, and management of objects, components, interfaces, features, messages, etc. into and by the PBCMS.

A feature may have any number of versions (e.g., $V_1, V_2, \ldots, V_n$, where n is an integer). Version $V_2$ is released after version $V_1$, version $V_3$ is released after version $V_2$, and so on. Each additional version has updates over a previous version. Development periods associated with each version may overlap. For example, a cruise control module developed for 2011 and 2012 vehicle models may be developed during the same time period.

During the second phase, features 160 of a feature set 162 are associated with each ring flavor version 164 of a ring flavor set 166, are copied from a product-line memory, and are combined. Example ring flavors are a fuel control ring, a spark control ring, an emission control ring, etc. The features, such as the components and/or interfaces, associated with that version may be selected by an engineer or by the product-line managing module 18''' based on a second BOM rule set provided by a product-line BOM. The versions for each ring flavor are generated. The versions are associated with each ring flavor based on the second BOM rule set from the product-line BOM. The second phase may be performed automatically by the product-line managing module 18''' or may be performed based on engineer entered feature selection inputs.

During the third phase, group flavor versions 168 of a group flavor set 170 are created based on a third BOM rule set from the product-line managing module. Example group flavors are torque, engine, platform, vehicle, etc. The product-line managing module 18''' combines selected ring flavors based on the third BOM rule set to create the group flavors.

During the fourth phase, control system versions 174 of a control system set 176 are created based on a fourth BOM rule set from the product-line managing module 18'''. The product-line managing module 18''' combines selected group flavors based on the fourth BOM rule set to create the control system versions. An example control system is a powertrain control system.

During the fifth phase, a control module 178 is created based on a fifth BOM rule set from the product-line managing module 18'''. The product-line managing module 18''' assembles the control module based on selected control system(s) and the fifth BOM rule set. Example control modules are an engine control module, a transmission control module and a hybrid control module. The five BOM rule sets may be distinct and independent of each other or may be dependent on each other and/or may be part of a single BOM rule superset.

Although particular flavor identification (ID)s are provided herein for control systems, group flavors, ring flavors, and features, the IDs are for example purposes only, other IDs may be used. Also, although one ID is provided for a flavor on a particular hierarchal content level, that ID may be used instead to identify a flavor on a different hierarchal content level. For example, cruise control may be a component on the fifth hierarchal content level of FIG. 9 or may be a group flavor on the third hierarchal content level, as shown in FIG. 14, and have corresponding ring flavors and features. The term "hierarchal content level" is referred to herein for simplicity as a "level". Each level or level branch may refer to content for a particular provider (e.g., provider module) or consumer (e.g., consumer module). Providers and consumers are described below with respect to FIG. 17.

Figure 8:
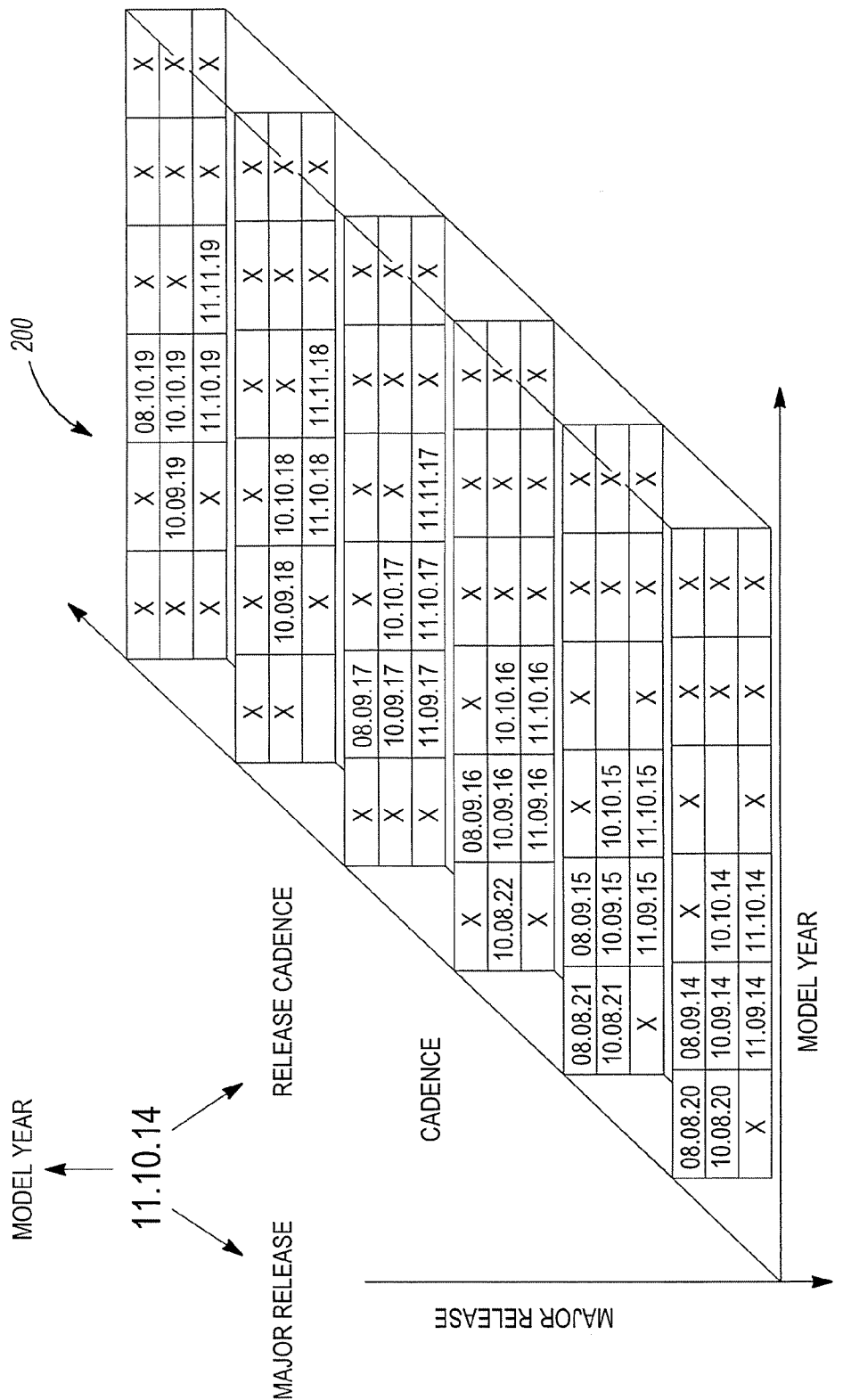
FIG. 8 is an exemplary product-line series release matrix in accordance with an embodiment of the present disclosure.

In FIG. 8, an exemplary product-line series release matrix 200 is shown. The product-line series release matrix 200 is a three dimensional matrix, where the dimensions are major release, model year and cadence. The product-line series release matrix 200 may also identify a version number for each release. A cadence release refers to releases between major release dates. The product-line series release matrix is used when creating a product-line BOM snapshot for use in developing and building a product. Each three numerical entry (e.g., 08.08.21) may refer to a version of a particular product and/or features of that product for a particular release date.

In FIG. 9, an exemplary project decomposition diagram is shown. The project decomposition diagram may, for example, be generated by the hierarchy and decomposition layer 146 and information pertaining to the project decomposition diagram may be stored in one or more of the databases 68, 70 and 76. The project decomposition diagram illustrates a hierarchal configuration provided by a PBCMS and/or a product-line managing module, such as by the PBCMS 10 or one of the product-line managing modules 18, 18', 18'', 18'''. Various levels are shown. Each level may be associated with or represented by a particular folder or set of sub-folders. A first or highest level is a product algorithm content (PAC) series level. The PAC series level may, for example, refer to a control module or set of control modules (e.g., engine control module, transmission control module, hybrid control module, etc.), content of a control module and/or to a particular series of a control module. Each level of the hierarchal configuration may include any number of level branches. A first level branch for the first level may refer to, for example, a first PAC, whereas a first level branch for the second level may refer to a second PAC.

Second levels or levels under the first level include product-line level(s) and/or BOM level(s). The product-line level may refer to a control module. Levels under a product-line level may identify content available for the product of that product-line level. The BOM levels may include project BOMS, control module BOMs, product BOMS, etc. Third levels or levels under the second levels are group flavor levels. Fourth levels or levels under the third levels are ring flavor levels. Fifth levels or levels under the fourth levels are feature levels, such as features, interface levels (e.g., formal interface layer (FIL) levels) and component levels.

In FIG. 10, an exemplary ring project window 230 is shown. Information pertaining to the project window 230 may be stored in one or more of the databases 68, 70 and 76. The project window 230 includes a left hand side (LHS) 232 and a right hand side (RHS) 234. The LHS 232 provides access to a product-line hierarchal tree, which is sometimes referred to as a superset. A group flavor, a ring flavor, and/or a feature may be selected on the LHS 232 and a description of that selected flavor or feature may be viewed on the RHS 234. As an example, the phasor ring (PHSR) is shown as being selected. For the PHSR, various items may be shown along with associated flavors, versions, statuses of the versions, owners and release dates for each item. An example list of items is shown in FIG. 10. The example list includes a ring level view, consumer interfaces, interface layer, a work file, and a PHSR function.

In FIG. 11, an exemplary bill of materials (BOM) window 240 is shown. Information pertaining to the BOM window 240 may be stored in one or more of the databases 68, 70 and 76. The BOM window 240, as shown, is for a control module and includes a group flavor selection box 242 and a ring flavor selection box 244. The group flavor selection box 242 provides a list of group flavors and corresponding variants for each flavor. The ring flavor selection box 244 provides a list of ring flavors and corresponding variants.

In FIG. 12, an exemplary flavor assignment window 250 is shown. The flavor assignment window 250 may be provided by the mapping and relationship management layer 148 and information pertaining to the flavor assignment window may be stored in one or more of the databases 68, 70 and 76. The flavor assignment window 250 includes a LHS 252 and a RHS 254. The LHS 252 with the product-line hierarchal tree for group, ring, and/or feature selection. The RHS 254 includes a list of items with version columns. The list of items shown in FIG. 12 includes interfaces and/or functions. The version columns are designated FUNC (for functions), MSG (for messages) and NF (for non-functions). The version columns include selection boxes for selecting the items that are to be included in each version associated with each version column based on user input signals. In the example shown, the items include different interfaces for the phasor ring flavor. The version columns include a function column, a message column, and a non-function column.

For each phasor ring interface a function, message and/or non-function may be selected. A function is provided for a particular version when a selection box is checked for that function. A message (i.e., signal associated with that interface is provided to another control module) when a selection box is checked for that message. A function is not provided for a particular version when a non-function selection box is checked indicating not to perform that function. For example, a certain version of a product may not have electronic throttle control, as a result certain functions may not be provided. Selection boxes in the non-function column are checked to prevent the functions from being provided.

In FIG. 13, an exemplary ring ownership management window 260 is shown. Information pertaining to the ring ownership management window 260 may be stored in one or more of the databases 68-78. The ring ownership management window 260 includes a LHS 262 with a list of ring flavors. The ring ownership management window 260 also includes a RHS 264 with fields and corresponding values. The values identify the name, type description, and owners of a selected ring flavor. An owner value box in the RHS 264 may be selected to open an owner entry window 266. The owner entry window 266 allows the owner ID to be changed and for owners to be added and/or removed. An owner refers to a person responsible for that particular ring flavor. Owners may be provided for content level items, such as control modules, control systems, group flavors, ring flavors, features, BOMs, etc.

In FIG. 14, an exemplary product-line content window 270 is shown. Information pertaining to the product-line content window 270 may be stored in one or more of the databases 68, 70, 76. The product-line content window 270 illustrates a product-line BOM. The product-line content window includes a LHS 272 and a RHS 274. The LHS 272 provides the product-line hierarchal tree. The RHS 274 provides a list of items and corresponding flavors, versions, statuses, owners, release dates, etc. The items that are shown in FIG. 14 are group flavors.

Figure 15:
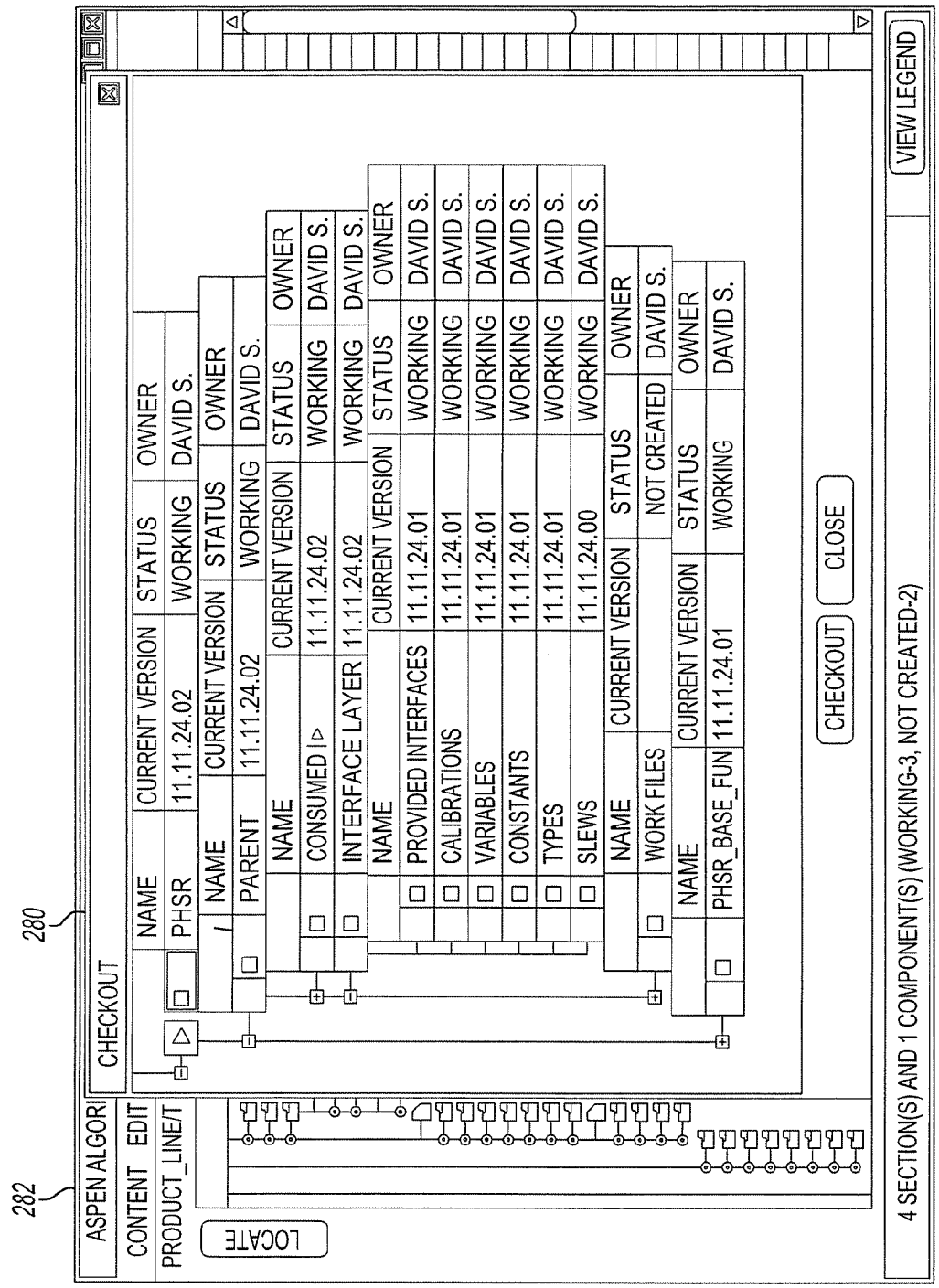
FIG. 15 is an exemplary ring checkout window in accordance with an embodiment of the present disclosure.

In FIG. 15, an exemplary ring checkout window 280 is shown. Information pertaining to the ring checkout window 280 may be stored in one or more of the databases 68, 70, 76. The ring checkout window 280 may be selected and opened from a ring project window 282. The ring checkout window 280 identifies attributes including ring flavor name, ring flavor parent (e.g., group ID), consumed interface, interface layer, provided interfaces, calibrations, variables, constants, types, stews, work files, ring flavor functions and associated versions, statuses, and ownerships. The attributes may be accessed and altered. Certain attributes may be opened to obtain additional information. For example, the ring flavor functions may be opened (e.g., double clicking on the corresponding box in the window 280) to obtain function definitions. The alteration of the attributes may be performed by a person with authority, such as by an owner and/or a system administrator. This may include the use of user IDs and/or passwords.

In FIG. 16, an exemplary life cycle diagram 300 is shown. A product-line managing module, such as one of the modules 18, 18', 18", 18''', via the version control and life cycle management (VCLC) layer 150 manages each object and associate feature. Life-cycle management information may be stored in one or more of the databases 68, 70, 76, 78. Each object and associated feature is independently managed. The version control and life cycle management layer 150 tracks parallel and series releases. In FIG. 16, a parallel release refers to a version of a feature or product that is developed while another version of the same feature or product is developed. As an example, in FIG. 16 version release 11.12.1.1 is developed while version release 11.11.3.1 is developed. A series release refers to a second version of a feature or product that is developed after a first version of the same feature or product. As an example, in FIG. 16 version release 11.11.2.1 is a series release as it is developed after release 11.11.1.1.

A PBCMS, such as the PBCMS 10, provides revision and version control capabilities. The VCLC layer 150 is used to revise previously generated versions. The VCLC layer 150 may also be used to copy and modify or update previous versions to create new versions. The VCLC layer 150 may perform branching and merging of versions. In FIG. 16, branching is provided by generation of versions 11.12.1.1 and 11.11.1.1 based on version 11.10.2.1. In FIG. 16, version 11.12.1.1 is created through the merging of versions 11.10.2.22 and 11.11.2.1. Each object and/or associated feature may be identified by a unique ID. The unique ID may remain locked for all versions. Each object and/or associate feature may also have a user defined name that is an attribute and can change among versions.

The PBCMS 10 enables system engineering and architecture management in an organization. Knowledge invented early in a development and build process is captured and maintained to prevent loss thereof. The PBCMS 10 prevents data reentry, chaos in managing content of a product portfolio, and prevents collaboration issues between engineers and/or associated with features, components, interfaces, etc. The PBCMS 10 also allows for data reuse, integration and automation in product development and delivery. Robust data population is provided early in the development and build process.

The PBCMS 10 allows for easy managing of a complex product portfolio, facilitates and provides simple and robust global collaboration, enables automation of development and build of a product, allows for enforcement and checking of a product, a foundation to integrate data and processes, and allows for reuse of data for improved productivity and quality.

Figure 17:
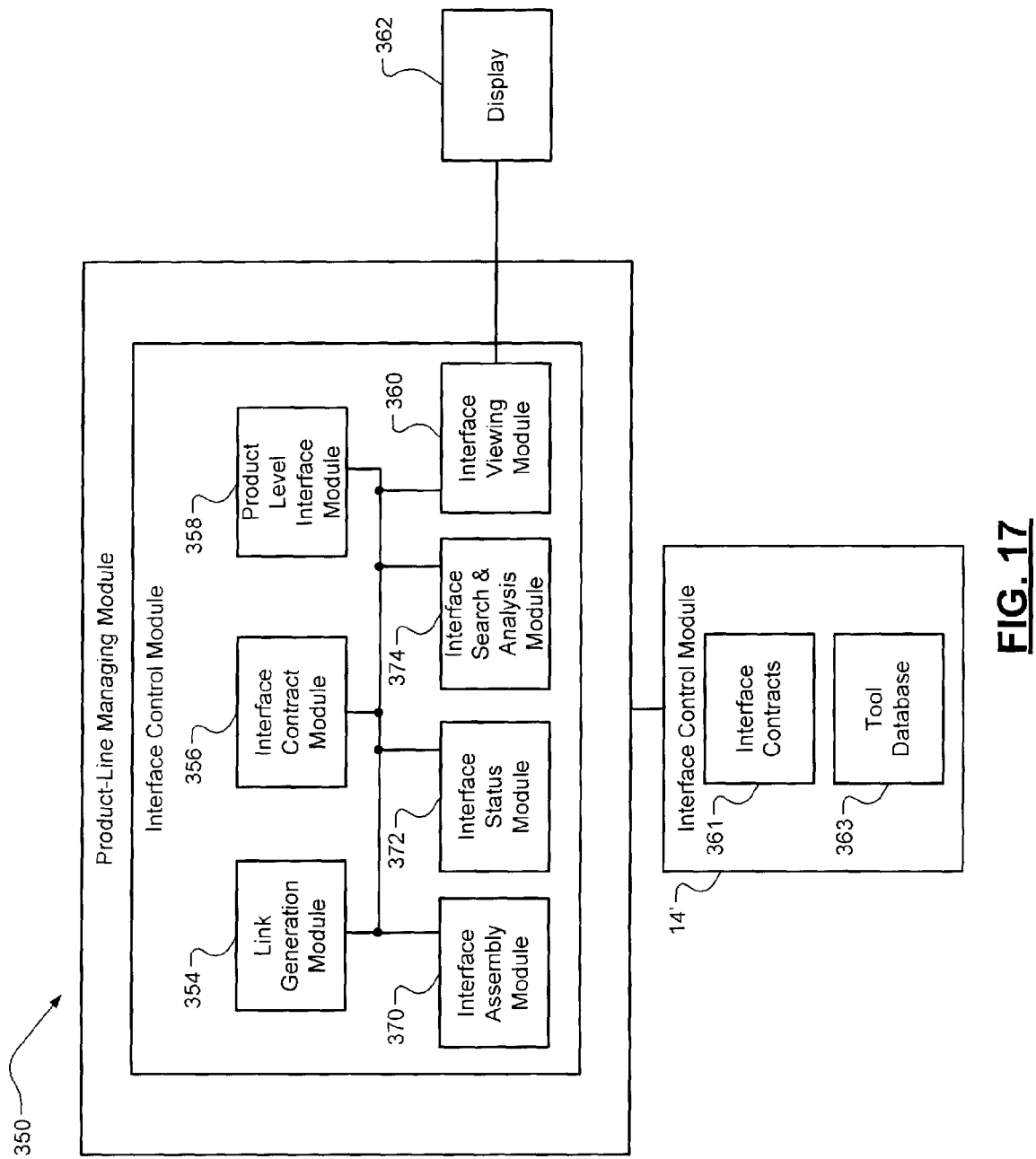
In FIG. 17, is an interface control system in accordance with an embodiment of the present disclosure.

In FIG. 17, an interface control system 350 is shown. The interface control system 350 includes a product-line managing module $18^{IV}$ that includes an interface control module 352. The interface control module 352 includes a link management module 354, an interface contract module 356, a product level interface module 358 and an interface viewing module 360. A product(s) and associated product-line series release project may contain a superset of interfaces. The interface control module 352 is used to develop, manage, store, reuse, view and analyze the interfaces at various stages in a development and/or manufacturing process.

Figure 18:
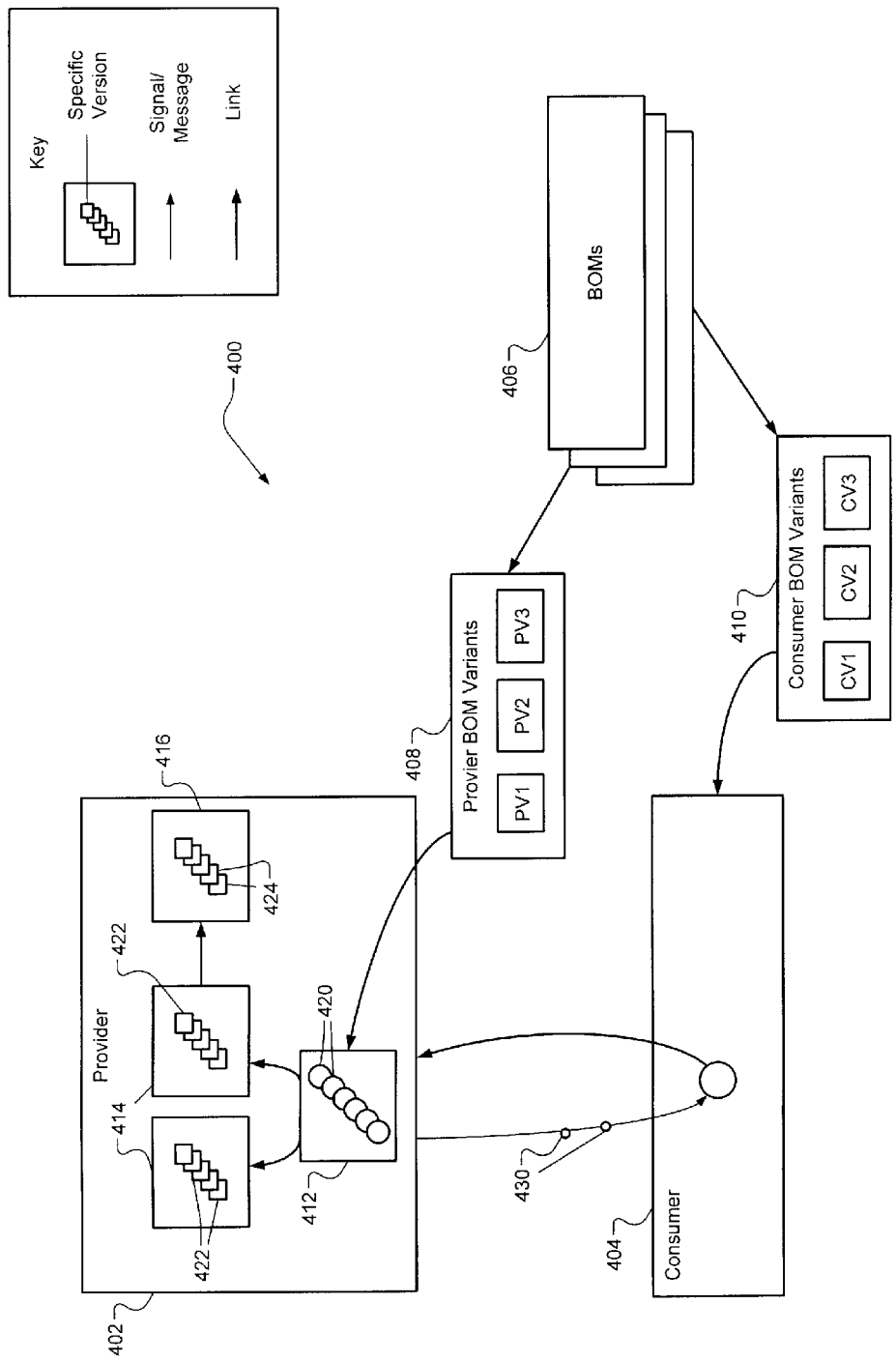
In FIG. 18, is an interface data model in accordance with an embodiment of the present disclosure.

The link generation module 354 generates links between provider modules and consumer modules. A provider module, for example, refers to a module that generates a parameter value, which is provided to a consumer module. A module may be a provider, a consumer and/or a provider and a consumer. A link may be generated to point from the consumer module to the provider module. A provider module may generate a parameter signal that is received by the consumer module. This is shown in FIG. 18.

The interface contract module 356 generates interface contracts 361 that are created between a provider module and a consumer module. Interface contracts may be defined by a provider module (referred to as the server) when the provider component performs tasks for the consumer module (referred to as the client). Interface contracts may be defined by one or more reusable independent object entities in a tool database 363, in the product-line memory 14', and/or by the interface contract module 356. Each interface contract is associated with one or more products (control modules), where the products are configured based on a BOM(s) of a corresponding product-line project. The product-line managing module $18^{IV}$ assembles product specific sets of interfaces based on a correspond BOM(s). Interface contracts may be stored in the product-line memory 14'.

Each interface may be specific to a particular product-line release (product) and may include a signature and a definition. The signature may be specific to a release and is established when the interface is created and may identify the interface via an interface ID and may also identify the owner. An interface may have one or more variants. The variants may be assigned to various products in a product-line series. A set of interfaces may be defined at a component level, a ring level, a group level, or at a control system level for local and external components of a module and/or product to consume.

Figure 20:
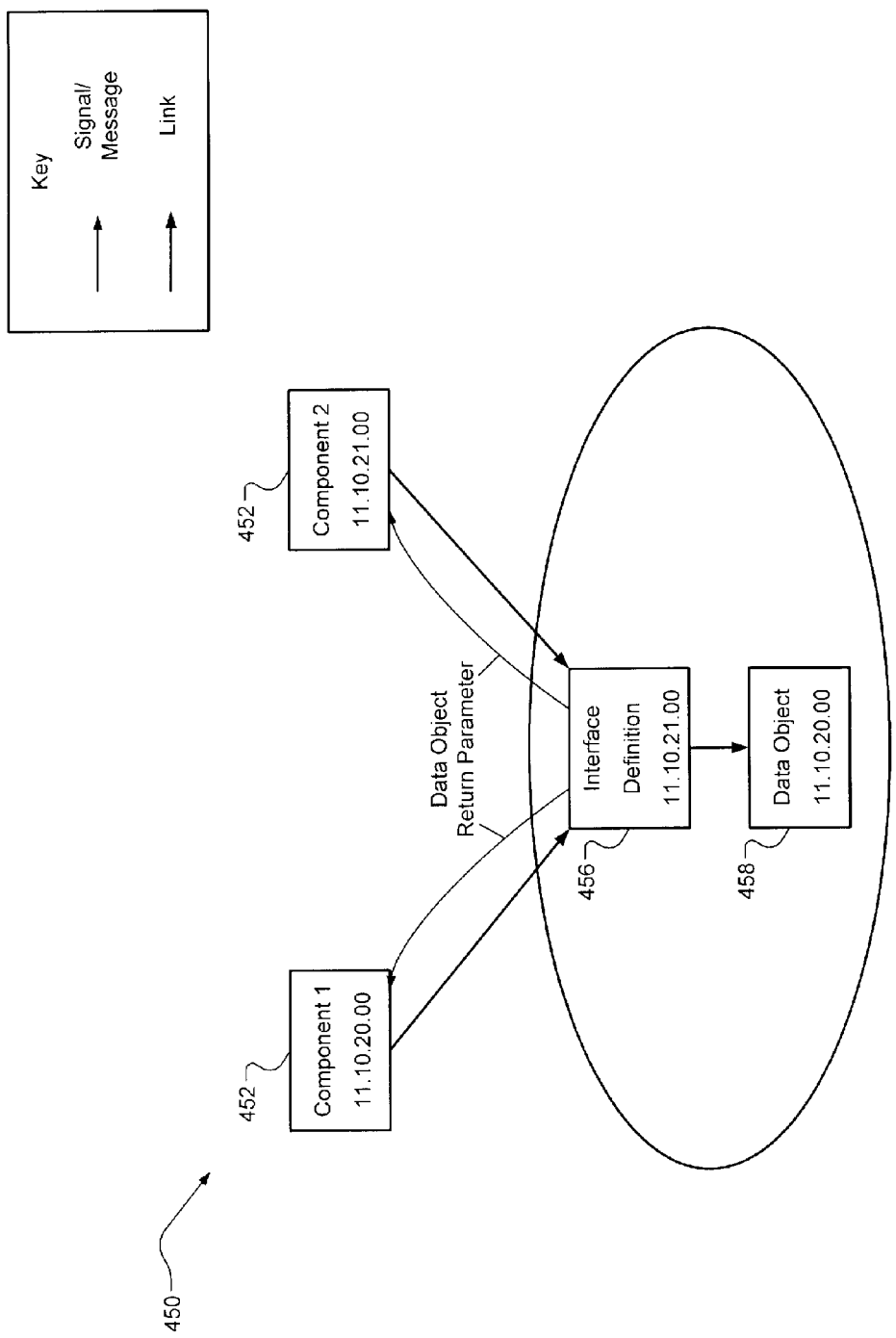
In FIG. 20, is an exemplary interface contract in accordance with an embodiment of the present disclosure.
Figure 21:
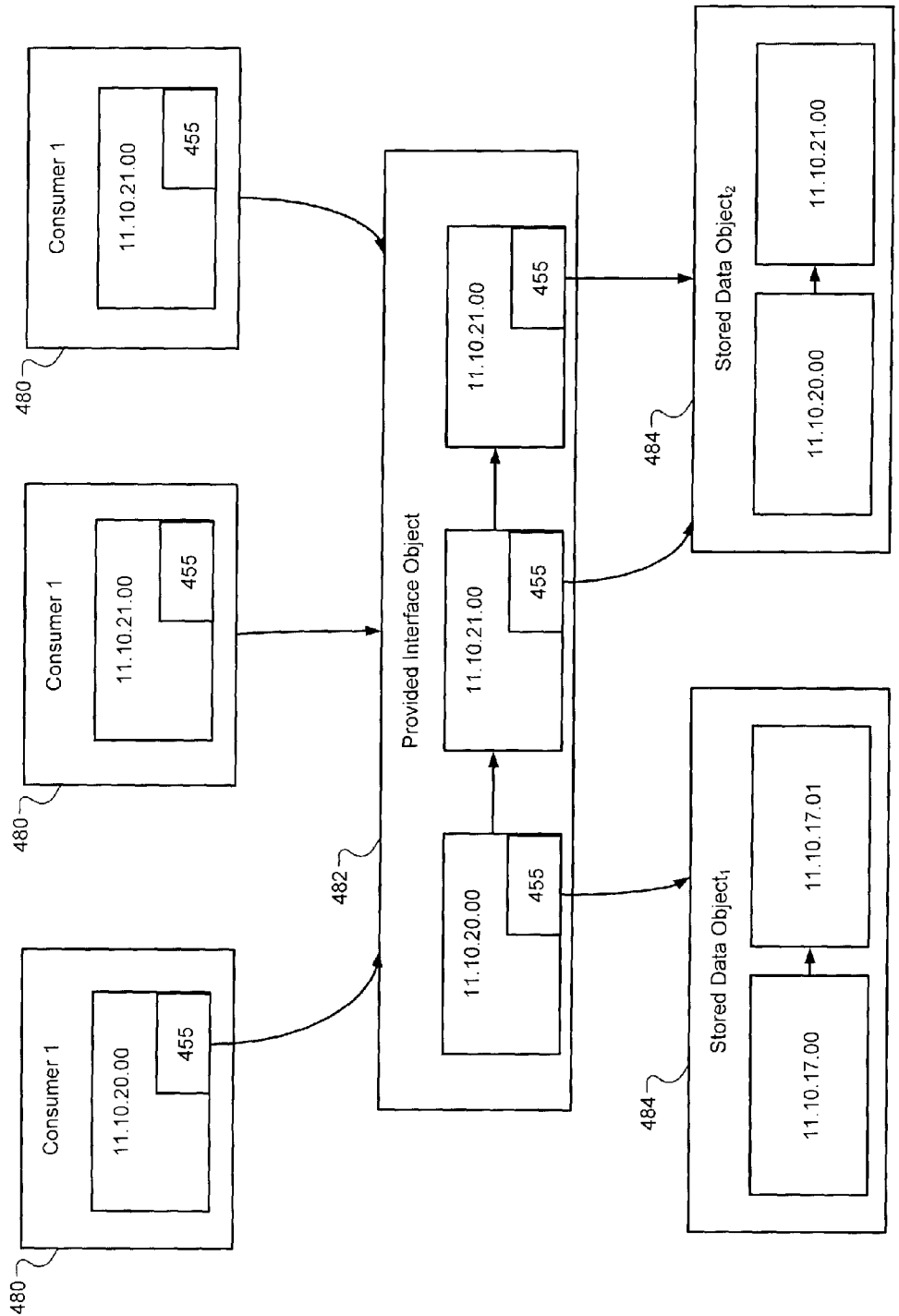
In FIG. 21, is a multiple interface diagram in accordance with an embodiment of the present disclosure.
Figure 22:
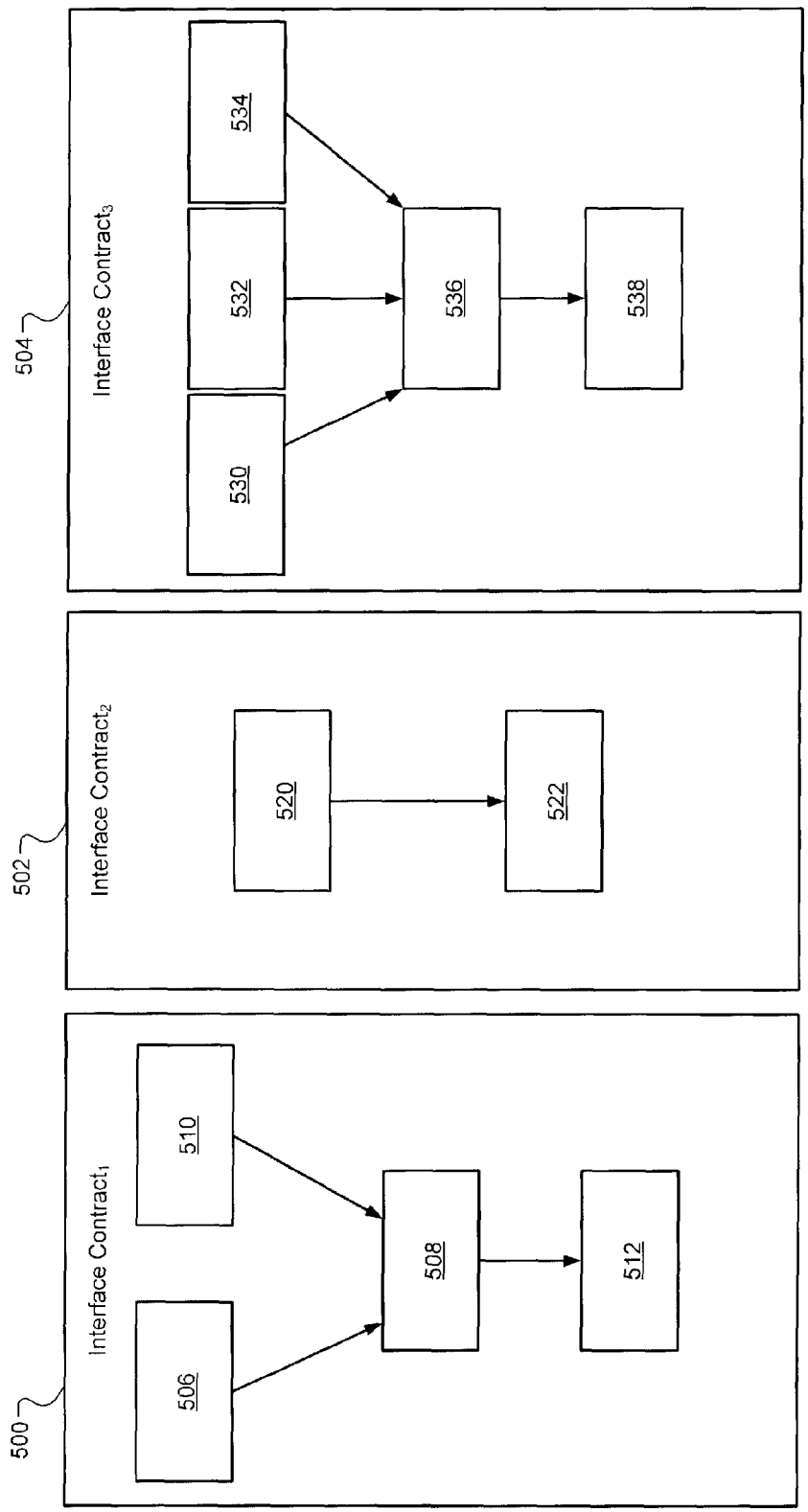
In FIG. 22, is a diagram illustrating multiple interface contracts in accordance with an embodiment of the present disclosure.

An interface contract may identify and define one or more provider and consumer module relationships for one or more products and include provider and consumer IDs, interface definition object IDs, dependent object IDs, link IDs, signal and/or message IDs, etc. An interface contract may be between distinct and remote control modules, between modules of a control module, and/or between contract level items, control systems, group flavors, ring flavors, and features, etc. An interface contract may be between content of different hierarchal levels (e.g., between a group flavor and a ring flavor); the hierarchal levels may be of a single control module or of different control modules. Interface contracts may be associated with a particular control module, provider, consumer, and/or version or release of that control module, provider and/or consumer. The interface status module may flag (mark) interfaces as being associated with a particular product. Some example interface contracts are shown in FIGS. 20-22. An interface contract may identify links to each hierarchal content level and level branches between a provider device and a consumer device. The interface contracts may also identify the links, signals, messages, and/or data objects associated with one or more interfaces.

The interface contract module 356 may be used to establish a new contract. The interface contract module 356 may provide a link to a previous contract, copy a previous contract (e.g., save a previous contract as a new contract) or generate a new contract without reference to a previous contract. The newly established contracts may be individually modified. This allows for reuse and inheritance of previous generated and stored contract version information. The ability to manage each interface in a module provides fine grain reuse and altering of interfaces.

The product level interface module 358 records and identifies the interfaces used by and/or associated with a hierarchal level. A first level may have S sub-levels and each of the S sub-levels may have a respective number of consumers and/or interfaces, where S is an integer greater than 1. The product level interface module 358 identifies the consumers and interfaces associated with each of the S sub-levels as being associated with the first level. This is further described with respect FIG. 19.

The interface viewing module 360 (product viewing module) displays logical and physical views of products on a display 362 before and/or after assembly of the products. The display 362 may be located at one of the remote devices 16 of FIG. 1. This includes the display of logical and physical views of interfaces of modules, control modules and/or products. This allows a designer or engineer to view work product during early stages of a design process.

The interface control module 352 or product-line managing module $18^{IV}$ may also include an assembly module, such as an interface assembly module 370, which may assemble control modules, modules, control systems, groups, rings, etc. The interface control module 352 may also include an interface status module 372 and an interface search and analysis (ISAA) module 374. The interface status module 372 determines workflow states of interfaces. The interface status module 372 determines a readiness level of the interfaces based on the workflow states. The interface assembly module 370 may assemble modules of the product and/or the product based on the readiness level. The interface status module 372 may generate a consumption indicator signal and/or a release indicator signal to indicate when the interfaces are ready for consumption implementation and/or ready for release. The consumption and release indicator signals may be based on workflow states of a provider and/or a consumer.

The ISAA module 374 searches product-line memory 14' for interfaces and performs analysis on stored interfaces. The ISAA module 374 performs analysis on a product based on interfaces established for that product. This may occur early in a design process. Analysis may be performed on, for example, the control modules and products shown in FIGS. 23-26. Analysis may include providing an example set of inputs for the product, generating outputs based on the product and the inputs (including executing code of the product), and analyzing the outputs based on the inputs. Various analysis procedures may be performed. Including test, calibration, and verification procedures.

Referring now also to FIG. 18, where an interface data model 400 is shown. Thousands of links between providers and consumers may exist in a product for each product release. The interface data model 400 illustrates an example of links and signals or messages associated with an interface contract between a provider (or provider interface) 402 and a consumer (or a consumer interface) 404. Links may refer to pointers from a consumer to a provider or connections between a consumer and a provider. Each provider interface and consumer interface may be a linkable independent versioned entity. A provider interface may include an interface definition object, data objects and dependent objects. Interface definition objects, data objects and dependent objects are versioned objects.

A PBCMS may have various control module BOMs 406. Each control module BOM 406 may have provider and consumer BOM variants 408, 410. The provider and consumer BOM variants 408, 410 are associated with and thus linked to: the provider 402; the consumer 404; and/or interface definition objects thereof, such as the interface definition object 412. The interface definition object 412 may be linked data objects, which may be linked to dependent objects. Two data objects 414 and one dependent object 416 is shown. An interface definition object may refer to a component or set of code associated with generating a data object (e.g., a parameter value). For example, an engine speed determining component or function [named getenginespeed( )] may generate an engine speed value EngineSpeed, where getenginespeed( ) is the interface definition object and EngineSpeed is a parameter data object.

As shown in FIG. 18, the interface definition object 412 may have multiple interface definition versions 420, where each interface definition version 420 may be linked to one or more data objects, such as the data objects 414. The data objects 414 may also have various versions 422. Also, each data object 414 may be linked to one or more dependent objects, such as the dependent object 416, which may have corresponding dependent versions 424. The links between the provider 402 and the consumer 404, between the interface definition object 412 and the data objects 414, and between the data objects 414 and the dependent object 416 are generated and stored by the link generation module 354.

Virtual consumer nodes 430 are shown for intermediate levels between the provider 402 and the consumer 404. The virtual nodes 430 may refer to levels or level branches between the provider 402 and the consumer 404. The virtual consumer nodes 430 are associate with the hierarchal mapping describe above. A virtual node may refer to, for example, a control system level, a group flavor level, and/or a ring flavor level between the provider 402 and the consumer 404. Although a link provides a direct mapping between the provider 402 and the consumer 404, the signal or message provided between the provider 402 and consumer 404 may cross multiple hierarchal levels.

Figure 19:
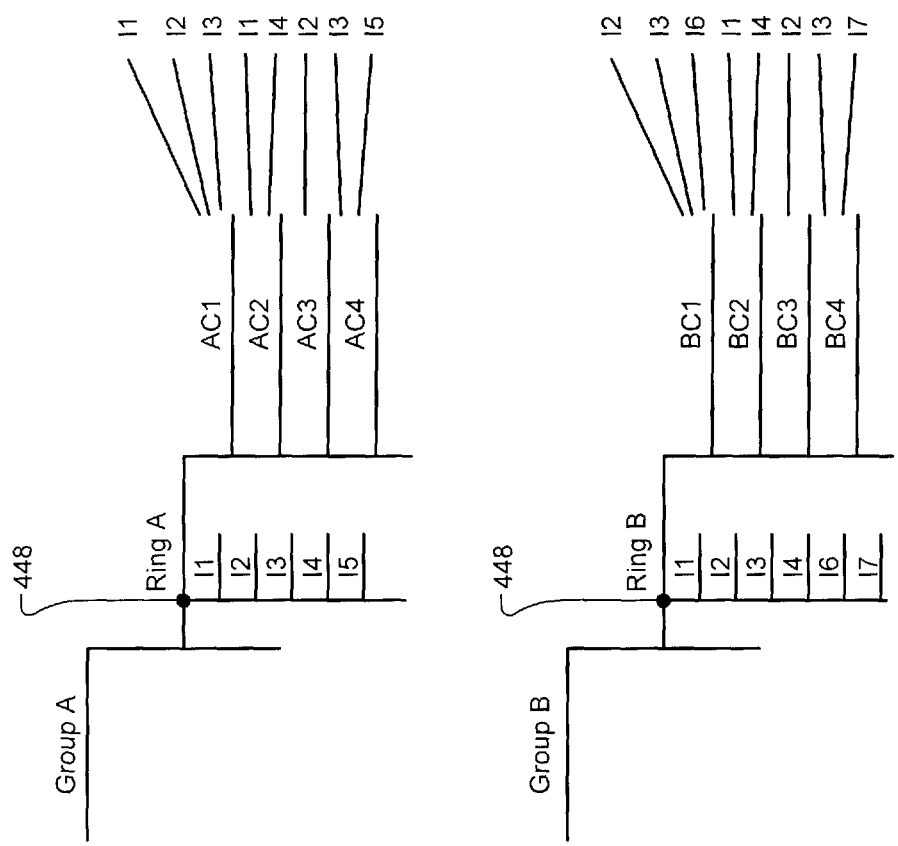
In FIG. 19, is a hierarchal interface diagram in accordance with an embodiment of the present disclosure.

In FIG. 19, a hierarchal interface diagram is shown. The hierarchal interface diagram illustrates the interfaces associated with a ring flavor A of a group A and a ring flavor B of a group B. The ring flavor A may have components or interface definition objects AC1-AC4, which may each be associated with one or ore of interfaces I1-I7. The ring flavor B may have components or interface definition objects BC1-BC4, which may each be associated with one or more of interfaces I1-I7. A system operator may click on a node of one of the ring flavor levels A and B (e.g., one of nodes 448) and be provided with a list of the interfaces associated with that ring flavor. For example, the node of ring flavor A may provide a list that includes interfaces I1-I5, as these are the interfaces associated with one or more of the interface definition objects AC1-AC4. Nodes may be virtual nodes, nodes generated and stored by the product level interface module 358, and/or visible nodes that can be selected by a system operator.

In FIG. 20, an exemplary interface contract 450 is shown. The interface contract 450 as shown represents a contract between first and second components 452, 454 and an interface definition object 456. The first and second components 452, 454 use a data object 458 generated by the interface definition object 456. For example only, the first component 452 may be a cruise control component and the second component 454 may be a fuel cutoff component. Each of the cruise control component and the fuel cutoff component may use a data object, such as an engine speed value. Links and signals between the components 452, 454 and the interface definition object 456 are shown.

In FIG. 21, a multiple interface diagram is shown. The multiple interface diagram illustrates links between multiple consumers 480 and a provider interface definition object 482. Each of the consumers 480 may use one or more data objects 484 generated by the provider interface definition object 482.

The provider interface definition object 482 may have multiple versions 486. Depending upon the version of the consumer, the consumers 480 may automatically receive the latest version (e.g., the version 11.10.21.00 shown) of the provider interface definition object 482. This is due to the links and associated definitions between the consumers 480 and the provider interface definition object 482. Similarly, each version of the provider interface definition object 482 may be linked to one or more of the data objects 484 and may automatically receive the latest version of the associated data objects (e.g., the versions 11.10.17.01 and 11.10.21.00 shown).

In FIG. 22, multiple interface contracts 500, 502, 504 are shown. Specifically, three interface contracts 500, 502, 504 are shown. The interface contracts 500, 502, 504 may be independent of each other and may be associated with and/or copied and used by multiple products. The first, second and third interface contracts 500, 502, 504 are associated with a first product. The first and third interface contracts 500, 504 are associated with a second product. The first interface contract 500 illustrates a contract between a first component 506 and a first interface definition object 508 and between a second component 510 and the first interface definition object 508. The first interface definition object 508 is linked to a first data object 512.

The second interface contract 502 is specific to the first product and may be between a third component 520 of the first product and a third interface definition object 522. The third component 520 may be one of the first and second components 506, 510 or may be distinct from the first and second components 506, 510.

The third interface contract 504 is between fifth, sixth and seventh components 530, 532, 534 and a third interface definition object 536, which is linked to a third data object 538. The third interface definition object 536 may be the same as or different than the first interface definition object 508.

Figure 23:
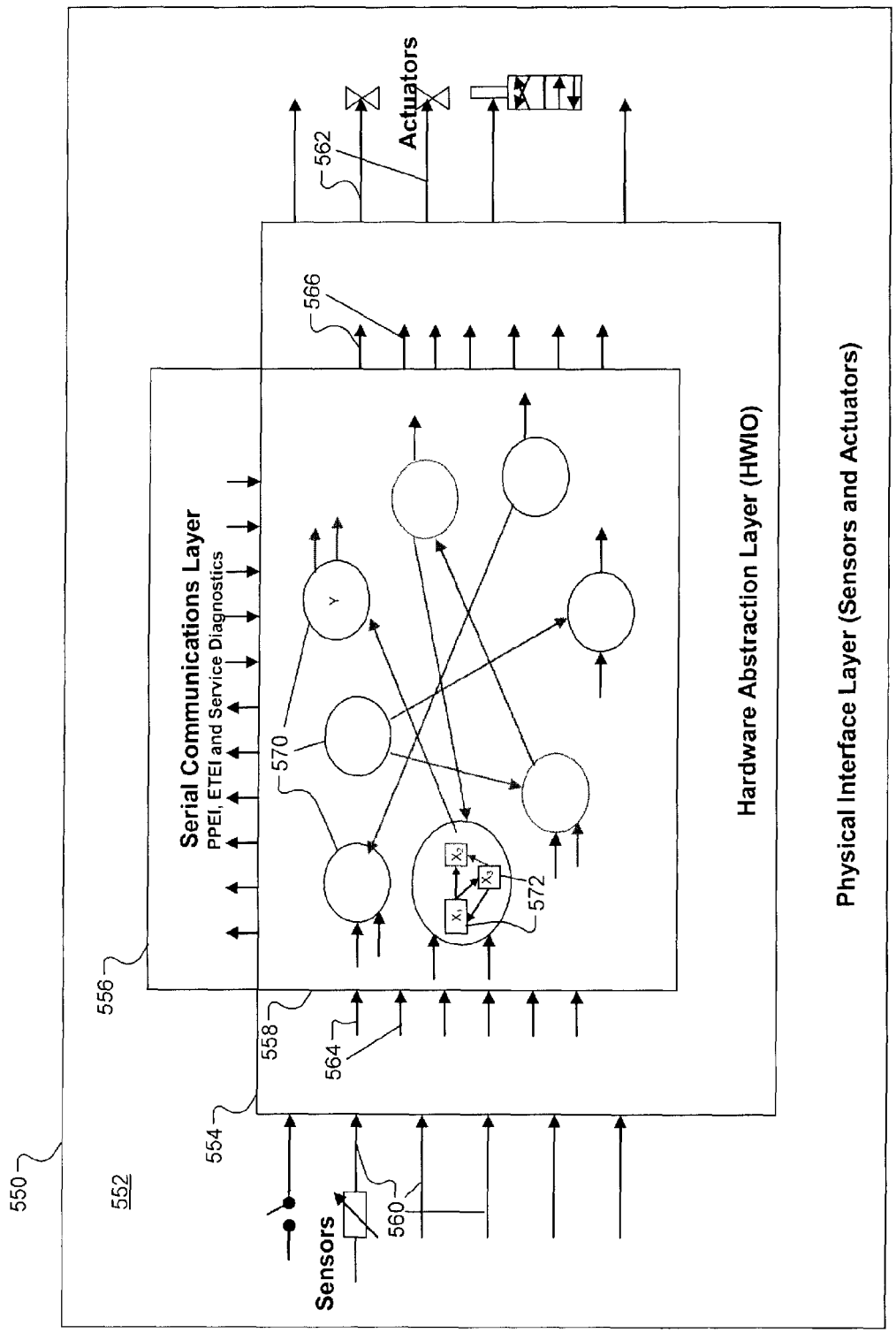
In FIG. 23, is a logical diagram of a control module generated using an interface data model according to an embodiment of the present disclosure.

Referring now to FIG. 17 and FIG. 23, a logical diagram of a product 550 (shown as a control module) is shown. The product 550 as shown includes a physical interface layer 552, a hardware abstraction layer 554, a serial communication layer 556 and an interface viewing window 558 of a software (SW) layer. The physical layer 552 may include various inputs 560 from, for example, sensors, switches, and/or other control inputs. The physical layer 550 may provide various outputs 562 based on the inputs 566. The outputs 562 may be, for example, provided to actuators, valves, etc. (e.g., phasor control valves, a fuel control system, a spark ignition system, etc.). Hardware abstraction layer inputs 564 (e.g., hardware input/output HWIO) may be generated based on the physical layer inputs 560. The physical layer outputs 562 may be based on the hardware abstraction layer inputs 564. The hardware abstraction layer inputs and outputs 564, 566 correspond to inputs and outputs of provider and consumer modules 570 of the control module 550.

The logical diagram of FIG. 23 illustrates links between the provider and consumer modules 570, which may be viewed by a system operator. The interface viewing module 360 may, for example, provide link interface views of the control module 550, such as the illustration of FIG. 23, on a display (e.g., the display 362). The interface viewing module 360 may show various levels of links. As shown, links may be between the provider and consumer modules 570. Links may also be between provider and consumer modules 572 of a provider module or of a consumer module. For example, module X performs as a provider for module Y. Module X includes sub-modules $x_1$, $x_2$ and $x_3$. Module $x_1$ performs as a provider to modules $x_2$ and $x_3$. Module $x_2$ performs as a consumer. Module $x_2$ performs as a consumer and as a provider.

Figure 24:
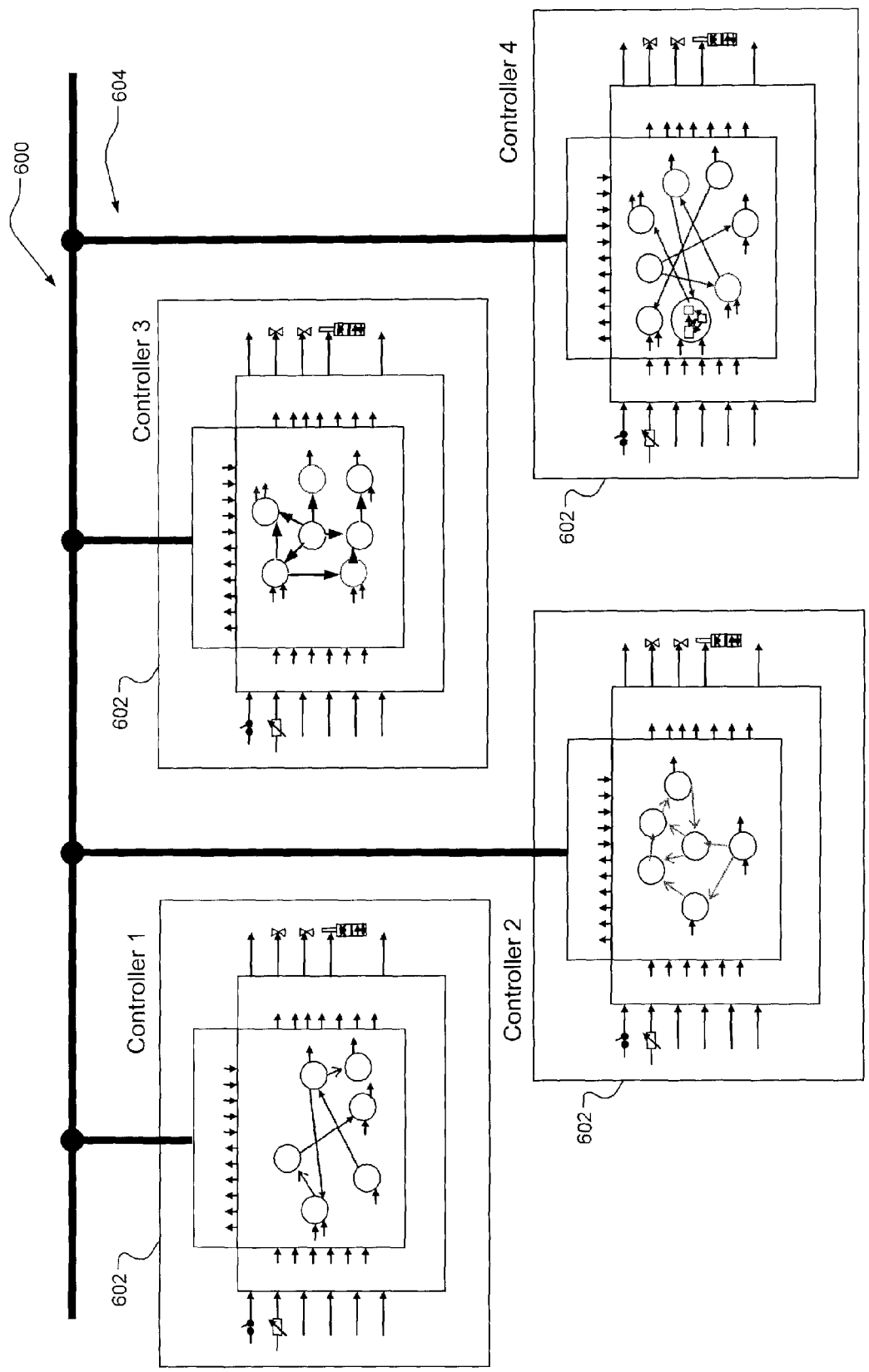
In FIG. 24, is a logical diagram of a multi-control module system with distinct and separate control modules according to another embodiment of the present disclosure.

Referring now also to FIG. 24, a logical diagram of a multi-control module system 600 with distinct and separate control modules 602 is shown. The multi-control module system 600 may be a vehicle control system that includes a network 604, such as a car area network. The network 604 provides communication between the control modules 602 over a bus 606. Interface link views of each of the control modules 602 are shown. The multi-control module system 600 as shown may be viewable on the display 362.

Figure 25:
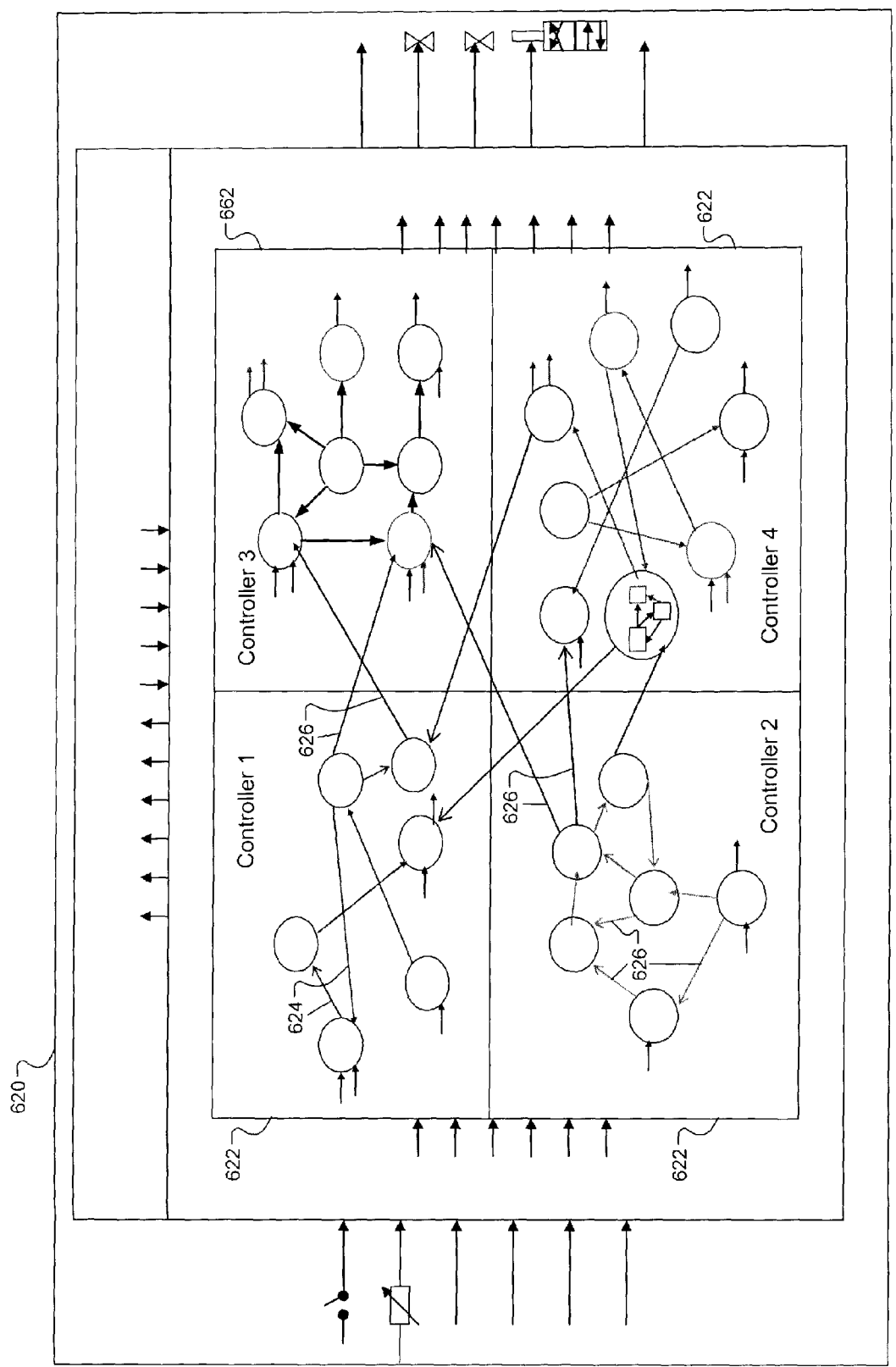
In FIG. 25, is a logical diagram of a multi-control module product illustrating logical interfaces between multiple control modules according to another embodiment of the present disclosure; and In FIG. 26, is view if a product set of multiple products of a product-line series project.

Referring now also to FIG. 25, a logical diagram of a multi-control module product 620 with logical interfaces between multiple control modules 622 is shown. A SW layer of the multi-control module product 620 includes the multiple control modules 622 that may be integrated into a single control module, as shown. Inner links 624 of each of the control modules 622 and cross-module links 626 between the control modules 622 are shown. Although shown for a single product, the diagram of FIG. 24 of multiple products may be converted into the diagram of FIG. 25 for ease in viewing the interrelationships between the products (i.e., between the control modules). Multi-control module products, such as the multi-control module product 620, may be viewable on the display 362.

Figure 26:
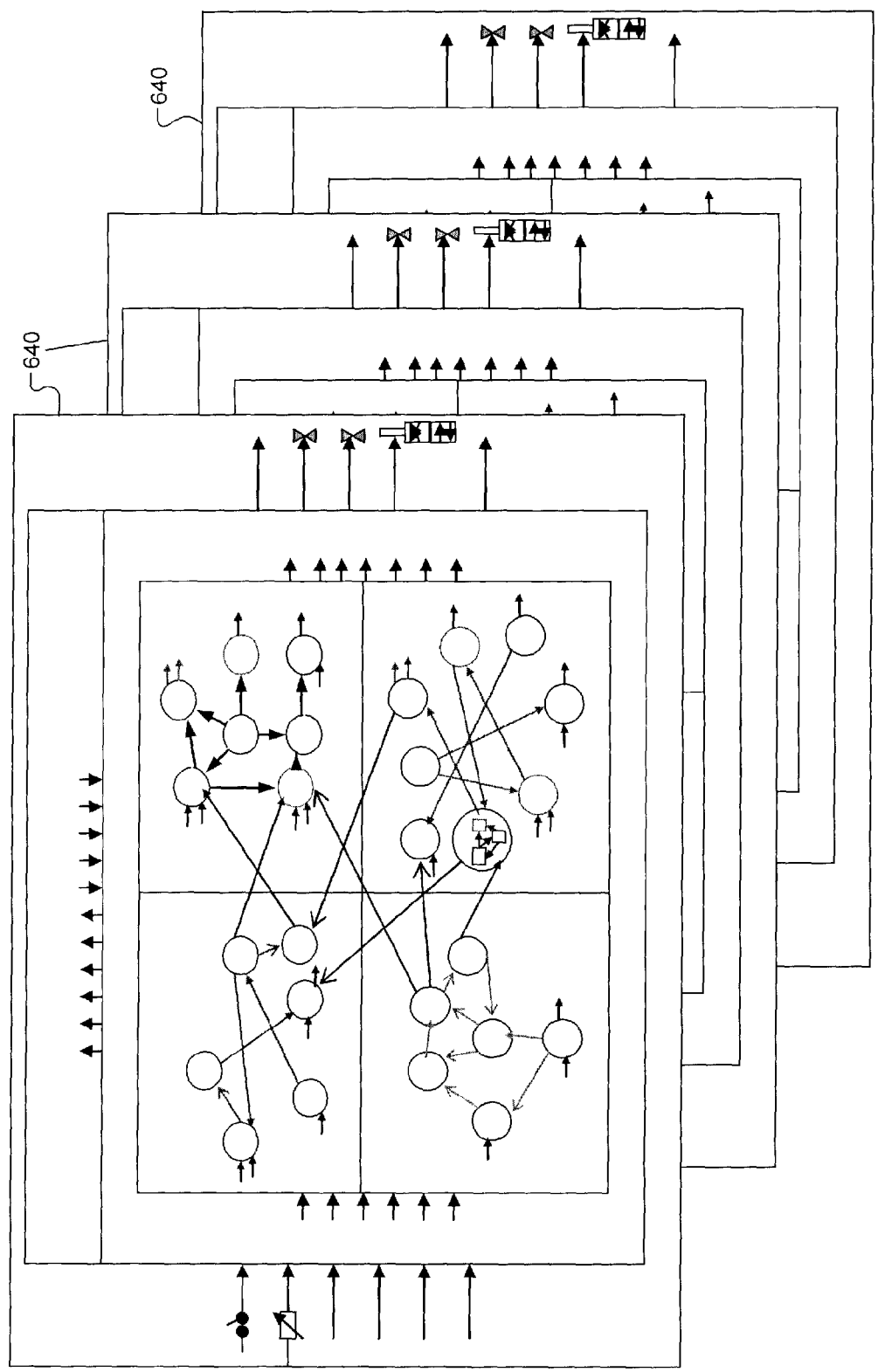

In FIG. 26, a product set of multiple products 640 of a product-line series project are shown. The products 640 are shown as control modules. Each of the products 640 may be independent of each other product, or each of the products 640 may be a version associated with a single product. The products 640 may be associated with one or more projects. In one embodiment, each of the products 640 is associated with a different vehicle release. The product-line series project may be viewable on the display 362.

Interface management as described herein provides support for organizational practices of functional and physical architecture development, collaboration ad parallel software development, assets (content) reuse and sharing, and software integration in a software product-line development environment. The interface management capabilities define and manage interfaces proactively and dynamically during functional requirements and software design process steps. This ensures robust collaboration and integration activities given a complex global software product-line portfolio. Interface management provides a mechanism to define interface contracts through which interactions are established between communicating components within a software system.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An interface control module comprising:
a link generation module that generates a first link of an interface between a provider module and a consumer module,
an interface contract module that generates an interface contract for the interface, wherein the provider module provides parameters to the consumer module via the interface according to the interface contract, and wherein:
the interface contract includes the first link; and
the interface contract defines the interface based on a bill of materials (BOM);
an interface assembly module that assembles modules including the provider module and the consumer module to generate a product, wherein the provider module and the consumer module are assembled to have the interface according to the interface contract; and
an interface viewing module that displays logical and physical views of the product on a display at least one of before and after assembly of the product.

2. The interface control module of claim 1, wherein the interface contract comprises a provider identification (ID), a consumer ID, an interface definition object ID, a link ID and a data object ID.

3. The interface control module of claim 1, wherein the interface contract defines, for a plurality of products, a plurality of relationships between feature elements of the provider module and the consumer module.

4. The interface control module of claim 3, wherein the feature elements comprise at least one of a component and an interface definition object.

5. The interface control module of claim 1, wherein the interface contract is between content level items of different hierarchal levels of the BOM.

6. The interface control module of claim 5, wherein:
the content level items comprise a control system, group flavors, ring flavors, and features;
each of the group flavors has a selected set of the ring flavors;
each of the ring flavors has a selected set of the features; and
the features include components and interfaces.

7. The interface control module of claim 1, wherein:
the provider module is on a different hierarchal level of the BOM than the consumer module;
the provider module includes an interface definition object and data objects;
the interface definition object generates the data objects; and
the data objects include the parameters.

8. The interface control module of claim 1, further comprising a product level interface module that identifies a plurality of interfaces associated with each hierarchal level of the BOM, wherein:
each of the plurality of interfaces has definitions corresponding to each of a plurality of ring flavors;
each of the definitions defines links of one of the plurality of interfaces; and
the interface between the provider module and the consumer module has at least one definition from each of the plurality of ring flavors.

9. The interface control module of claim 1, wherein the interface viewing module, when displaying the logical and physical views of the product, displays links between modules of the product including the first link between the provider module and the consumer module.

10. The interface control module of claim 1, wherein the interface contract module, based on the interface contract, creates a second interface contract based on the first interface contract.

11. A product-line managing module comprising the interface control module of claim 10 and further comprising:
the display; and
product-line memory that stores the interface contract.

12. The interface control module of claim 1, wherein:
the provider module is an interface definition object, the consumer module is a first component; and
the link generation module generates a second link between a data object and the interface definition object.

13. The interface control module of claim 12, wherein the link generation module generates a third link between a second component and the interface definition object.

14. The interface control module of claim 13, wherein the interface contract module defines the first link, the second link and the third link.

15. The interface control module of claim 1, further comprising an interface status module that determines a readiness level of the interface based on a workflow state,
wherein the assembly module assembles the product based on the readiness level.

16. The interface control module of claim 1, further comprising an interface search and analysis module that searches a product-line memory for the product and analyzes the product based on interfaces associated with the product including the interface between the provider module and the consumer module,
wherein the interface search and analysis module provides a plurality of inputs to the product and analyzes outputs of the product, and wherein the outputs are generated based on the plurality of inputs.

17. The interface control module of claim 1, wherein interface assembly module assembles the provider module and the consumer module based on a second version of the provider module and not a first version of the provider module and based on the first link,
wherein a release date of the first version is before a release date of the second version.

18. The interface control module of claim 17, wherein:
the first version is linked to a first data object and not to a second data object; and
the second version is linked to the second data object and not to the first data object.

19. The interface control module of claim 18, wherein the interface assembly module assembles the provider module and the consumer module based on a third version of the provider module,
wherein:
the release date of the second version is before a release date of the third version;
the third version is linked to the second data object;
the second version of the provider module is assembled based on a first version of the second data object; and
the third version of the provider module is assembled based on a second version of the second data object.

20. The interface control module of claim 1, wherein the interface viewing module displays links between modules of each of a plurality of control modules and displays links between the plurality of control modules on the display.

* * * * *